United States Patent
Yu et al.

(10) Patent No.: US 11,785,663 B2
(45) Date of Patent: *Oct. 10, 2023

(54) SESSION MANAGEMENT METHOD AND APPARATUS

(71) Applicant: HUAWEI TECHNOLOGIES CO., LTD., Guangdong (CN)

(72) Inventors: Youyang Yu, Shanghai (CN); Hancheng Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/582,152

(22) Filed: Jan. 24, 2022

(65) Prior Publication Data
US 2022/0150995 A1    May 12, 2022

Related U.S. Application Data

(63) Continuation of application No. 16/703,314, filed on Dec. 4, 2019, now Pat. No. 11,252,775, which is a
(Continued)

(30) Foreign Application Priority Data

Jun. 20, 2017   (CN) .......................... 201710471482.2

(51) Int. Cl.
*H04W 76/25*     (2018.01)
*H04L 12/28*     (2006.01)
(Continued)

(52) U.S. Cl.
CPC ......... *H04W 76/25* (2018.02); *H04L 12/2859* (2013.01); *H04W 8/26* (2013.01);
(Continued)

(58) Field of Classification Search
CPC ....... H04W 76/25; H04W 8/26; H04W 48/16; H04W 60/04; H04W 76/12; H04W 80/10;
(Continued)

(56) References Cited

U.S. PATENT DOCUMENTS 8,305,963 B1   11/2012   Breau et al.
8,612,612 B1   12/2013   Dukes et al.
(Continued)

FOREIGN PATENT DOCUMENTS

CN    102388639 A    3/2012
CN    102457444 A    5/2012
(Continued)

OTHER PUBLICATIONS

S2-171870 Huawei, HiSilicon,"TS 23.501: Relation between the SMF and UPF", SA WG2 Meeting #120, Mar. 27-31, 2017, Busan, Korea (9 pages).
(Continued)

*Primary Examiner* — Michael K Phillips

(57) ABSTRACT

Embodiments of the present disclosure disclose a session management method and an apparatus. The technology is specifically related to sending, by user equipment, a NAS message to an AGF, where the NAS message includes a PDU session establishment request message used to request to establish a PDU session, receiving, by the user equipment, a PDU session establishment accept message returned by a network side device, and establishing, by the user equipment, an access session with the AGF, where the access session is an access session related to the PDU session. The user equipment sends the NAS message to establish the PDU session, and establishes the access session with the AGF. Because the access session is related to the PDU
(Continued)

session, the user equipment can map the PDU session to the access session, so that the user equipment accesses a 5G CN through a fixed network.

12 Claims, 7 Drawing Sheets

Related U.S. Application Data continuation of application No. PCT/CN2018/089974, filed on Jun. 5, 2018.

(51) Int. Cl.
| | | |
|---|---|---|
| *H04W 48/16* | (2009.01) | |
| *H04W 80/10* | (2009.01) | |
| *H04W 76/12* | (2018.01) | |
| *H04W 8/26* | (2009.01) | |
| *H04W 60/04* | (2009.01) | |

(52) U.S. Cl.
CPC .......... *H04W 48/16* (2013.01); *H04W 60/04* (2013.01); *H04W 76/12* (2018.02); *H04W 80/10* (2013.01)

(58) Field of Classification Search
CPC ... H04W 76/11; H04W 76/10; H04L 12/2859; H04L 67/14
See application file for complete search history.

(56) References Cited

U.S. PATENT DOCUMENTS

| | | | |
|---|---|---|---|
| 9,172,554 | B2 | 10/2015 | Sun |
| 10,117,100 | B2 | 10/2018 | John et al. |
| 11,252,775 | B2 * | 2/2022 | Yu .................. H04W 76/12 |
| 2003/0037163 | A1 | 2/2003 | Kitada et al. |
| 2006/0168270 | A1 | 7/2006 | Townsley et al. |
| 2006/0268738 | A1 | 11/2006 | Goerke et al. |
| 2007/0133576 | A1 | 6/2007 | Tsuge et al. |
| 2007/0263538 | A1 | 11/2007 | Hueck et al. |
| 2009/0034426 | A1 | 2/2009 | Luft et al. |
| 2012/0281591 | A1 | 11/2012 | Gu et al. |
| 2013/0167338 | A1 | 7/2013 | Janes et al. |
| 2014/0185603 | A1 | 7/2014 | John et al. |
| 2015/0080035 | A1 | 3/2015 | Tanaka et al. |
| 2015/0282026 | A1 | 10/2015 | Gupta |
| 2018/0152832 | A1 | 5/2018 | Yu et al. |
| 2018/0359675 | A1 | 12/2018 | Chandramouli et al. |
| 2018/0359802 | A1 | 12/2018 | Cho et al. |
| 2019/0069182 | A1 | 2/2019 | John et al. |
| 2019/0364420 | A1 | 11/2019 | Rommer et al. |
| 2020/0015311 | A1 | 1/2020 | Kim |
| 2020/0107388 | A1 | 4/2020 | You et al. |
| 2020/0128087 | A1 | 4/2020 | You et al. |
| 2020/0146077 | A1 | 5/2020 | Li et al. |
| 2020/0163145 | A1 | 5/2020 | Park et al. |
| 2021/0153111 | A1 | 5/2021 | Theimer et al. |

FOREIGN PATENT DOCUMENTS

| | | |
|---|---|---|
| CN | 102740401 A | 10/2012 |
| CN | 104170416 A | 11/2014 |
| CN | 104243297 A | 12/2014 |
| EP | 3582528 A1 | 12/2019 |
| EP | 3598693 A1 | 1/2020 |
| EP | 3618561 A1 | 3/2020 |
| JP | 2007104440 A | 4/2007 |
| JP | 2016506696 A | 3/2016 |
| KR | 20070020398 A | 2/2007 |
| WO | 2013154134 A1 | 10/2013 |
| WO | 2014122560 A2 | 8/2014 |
| WO | 2017078258 A | 5/2017 |
| WO | 2017095809 A1 | 6/2017 |

OTHER PUBLICATIONS

S2-170263 Samsung,"Interaction between AMF and SMF", SA WG2 Meeting #118-BIS, Jan. 16-20, 2017 Spokane, WA, USA (2 pages).
S2-171709 Qualcomm Incorporated,"TS 23.502: MM and SM interactions for MICO Ues", SA WG2 Meeting #S2-120, Mar. 27-31, 2017, Busan, South Korea (17 pages).
S2-171155 Catt,"SMF and UPF interactions", SA WG2 Meeting #S2-119, Feb. 13-17, 2017, Dubrovnik, Croatia (2 pages).
S2-171934 Nokia et al., "23.502 § 4.9: no notion of SMF relocation (only UPF relocation or application of SSC mode)", SA WG2 Meeting #120, Mar. 27-31, 2017, Busan, South Korea (4 pages).
S2-171981 NEC,"TS 23.502: Update to the SMF selection in PDU Session Establishment procedure", SA WG2 Meeting #120, Mar. 27-31, 2017, Busan, Korea (6 pages).
S2-172030 T-Mobile USA INC,"Enhancing IP Allocation between UPF and SMF", SA WG2 Meeting #120 Mar. 27-31, 2017, Busan, South Korea (5 pages).
3GPP TS 23.501 V0.3.0 (Feb. 2017), 3rd Generation Partnership Project; Technical Specification Group Services and System Aspects; System Architecture for the 5G System; Stage 2 (Release 15), Feb. 2017 (97 pages).
3GPP TS 23.502 V0.2.0 (Feb. 2017), 3rd Generation Partnership Project; Technical Specification Group Services and System Aspects; Procedures for the 5G System; Stage 2 (Release 15) (71 pages).
International Search Report issued in PCT/CN2018/079915 dated Jun. 19, 2018 with English Translation (11 pages).
S2-172879 Secretary of SA WG2, "Draft Report of SA WG2 meeting #120", SA WG2 Meeting #121, May 15-19, 2017, Hangzhou, P. R. China, total 403 pages.
Office Action dated Oct. 8, 2020, issued in KR Application No. 10-2019-7036476 with English translation, total 11 pages.
Notice of Allowance issued in U.S. Appl. No. 16/723,646, dated Jul. 8, 2021, total 11 pages.
NTT Docomo, Lenovo, Motorola Mobility, TS 23.502: Captures dual-registration mobility procedure from EPC to 5GC, 3GPP TSG-SA WG2 Meeting #121 S2-174057, [online], May 20, 2017, pp. 1-11.
3GPP TR 23.852 V2.0.0 (Sep. 2013), [online], Sep. 9, 2013, pp. 103-113.
Huawei, Hisilicon, 5WWC Architectural assumptions for the supporting of Wireless and Wireline convergence, 3GPP TSG-SA WG2 Meeting #122bis S2-175626, [online], Aug. 15, 2017, pp. 1-6.
Office Action dated Feb. 9, 2021 issued in JP Application No. 2020-517255 with English translation, total 9 pages.
Broadband Forum, "3GPP SA WG2 Meeting #120 S2-172603", bbf2017.250.01, Mar. 31, 2017 (3 pages).
3GPP, "3GPP TS 23.502 V0.4.0", 3GPP; Technical Specification Group Services and System Aspects; Procedures for the 5G System; Stage 2 (Release 15), May 31, 2017, sections 4.3.2 and 4.12.5 (126 pages).
Ericsson, "3GPP SA WG2 Meeting #118 S2-166398", non-3GPP user plane, Reno, Nevada, Nov. 18, 2016 (5 pages.
Huawei, "3GPP-BBF workshop SA2#119 3BF-170014", Key Issues on Supporting Wireline and Wireless Independent Core Network, Dubrovnik (Crotia), Feb. 28, 2017 (7 pages).
Office Action issued in U.S. Appl. No. 16/703,314, dated Jun. 10, 2021, 41 pages.
International Search Report for PCT/CN2018/089974, dated Aug. 27, 2018, 5 pages.
Notice of Allowance issued in U.S. Appl. No. 16/703,314, dated Oct. 6, 2021, total 15 pages.
Office Action issued in U.S. Appl. No. 17/497,005, dated Sep. 15, 2022, 6 pages.
Final Office Action issued in U.S. Appl. No. 17/497,005, dated Mar. 31, 2023, 13 pages.

* cited by examiner

SESSION MANAGEMENT METHOD AND APPARATUS

CROSS-REFERENCE TO RELATED APPLICATIONS

This application is a continuation of U.S. patent application Ser. No. 16/703,314, filed on Dec. 4, 2019, which is a continuation of International Patent Application No. PCT/CN2018/089974, filed on Jun. 5, 2018, which claims priority to Chinese Patent Application No. 201710471482.2, filed on Jun. 20, 2017. All of the afore-mentioned patent applications are hereby incorporated by reference in their entireties.

TECHNICAL FIELD

The present disclosure relates to the field of communications technologies, and in particular, to a session management method and an apparatus.

BACKGROUND

User equipment (UE) is also referred to as customer-premises equipment (CPE). In embodiments of this application, in addition to a hardware entity directly operated by a user, the user equipment includes a hardware entity on the user side, for example, a residential gateway (RG), a fixed network residential gateway (FNRG), and the like.

To rise to a challenge of a wireless broadband technology and keep the leading advantage of a 3rd generation partnership project (3GPP) network, the 3GPP standard organization formulates a next generation mobile communications network architecture (NGS), which is referred to as a 5G network architecture. The 5G network architecture not only supports access to a 5G core network (CN) by using a wireless technology defined in the 3GPP standard organization, but also supports access to the 5G core network by using a non-3GPP (non-3GPP) access technology and by using a non-3GPP interworking function (N3IWF) or a next generation access gateway (ngPDG). The wireless technology defined in the 3GPP standard organization includes long term evolution (LTE), a 5G radio access network (RAN), or the like.

The 5G core network includes a user plane function (UPF) device and a control plane function (CPF) device. The user plane network element is mainly responsible for forwarding a packet data packet, controlling quality of service (QoS), collecting statistics about charging information, and the like. The control plane network element is mainly responsible for user registration authentication, mobility management, delivery of a data packet forwarding policy to the UPF, a QoS control policy, and the like, and may further include a mobility management function (AMF) device and a session management function (SMF) device. Specifically, the AMF is responsible for a registration procedure during access by the user equipment and location management in a movement process of the user equipment. The SMF is responsible for establishing a corresponding session connection on the network side when the user equipment initiates a service, and providing a specific service for the user equipment, especially delivering the data packet forwarding policy, the QoS policy, and the like to the UPF based on an interface between the SMF and the UPF.

Currently, the user equipment initiates session establishment in two forms: initiating access to a fixed network to establish a session through the fixed network, and initiating access to a mobile network to establish a session through the mobile network. Currently, the 5G CN does not support a case in which the user equipment accesses the 5G CN by using the fixed network.

SUMMARY

A technical problem to be resolved in embodiments of the present disclosure is to provide a session management method and an apparatus, so that user equipment accesses a 5G CN through a fixed network. The 5G CN is referred to as a 5G converged core network in embodiments of this application.

According to a first aspect, an embodiment of the present disclosure provides a session management method, including:

sending, by user equipment, a non-access stratum (NAS) message to an access gateway function (AGF), where the NAS message includes a packet data unit (PDU) session establishment request message used to request to establish a PDU session; and receiving, by the user equipment, a PDU session establishment accept message returned by a network side device; and establishing, by the user equipment, an access session with the AGF, where the access session is an access session related to the PDU session.

In this embodiment, the user equipment sends the NAS message to establish the PDU session, and establishes the access session with the AGF. Because the access session is related to the PDU session, the user equipment can map the PDU session to the access session, so that the user equipment accesses a 5G CN through a fixed network.

In an optional implementation, several specific forms of the access session are further provided as follows: The access session includes:

a point-to-point protocol over Ethernet (PPPoE) session, a layer 2 (L2) Ethernet session, a layer 3 (L3) internet protocol session, or a generic routing encapsulation (GRE) tunnel.

L2 is a data link layer, and L3 is a network layer.

In an optional implementation, an implementation solution in which the AGF identifies the NAS is further provided. Details are as follows: The NAS message is encapsulated in a NAS message identifier, and the NAS message identifier is used to identify the NAS message.

The NAS message identifier may be any information that can be identified by the AGE The NAS message identifier is agreed on between the user equipment and the AGF to distinguish between the NAS message and user plane data.

In an optional implementation, two optional implementation solutions in which the NAS message is sent are further provided as follows: before sending, by user equipment, a non-access stratum (NAS) message to an AGF, the method further includes: establishing a PPPoE session between the user equipment and the AGF, and the sending, by user equipment, a non-access stratum (NAS) message to an AGF includes: encapsulating, by the user equipment, the NAS message in the PPPoE session, where the PPPoE session identifier is the NAS message identifier; or the sending, by user equipment, a non-access stratum (NAS) message to an AGF includes: sending the NAS message to the AGF by using a message in any one of a PPPoE discovery process, a Internet protocol control protocol (IPCP) process, and a link control protocol (LCP) process.

In the foregoing two optional implementations, in the former implementation, the PPPoE session is first established to transmit the NAS message. In this case, the PPPoE session may be used to notify the AGF that the NAS message is sent. Therefore, identification information may not need to be newly added. In the latter implementation, several application scenarios in which the NAS message is sent are provided.

In an optional implementation, an implementation solution in which the AGF is notified of an access session to which the PDU session is related is further provided. Details are as follows: The PDU session establishment request message further includes a session identifier, and the session identifier is identification information of the access session related to the PDU session.

The session identifier may be any identifier agreed on between the AGF and a PDU to identify an access session to which the PDU session is related. Because the PDU session establishment request is used to request to establish the PDU session, the session identifier may be any identifier that can identify the access session, or is mapped to the access session, or is mapped to the user equipment.

In an optional implementation, the method further includes: receiving, by the AGF, PDU session information sent by the SMF; assigning, by the AGF, a session identifier to the PDU session; and sending, by the AGF, the session identifier to the SMF, so that the SMF adds the session identifier to the PDU session establishment accept message, and sends the PDU session establishment accept message to the user equipment; or receiving, by the AGF, the PDU session establishment accept message sent by the SMF, so that the AGF assigns a session identifier to the PDU session; and encapsulating, by the AGF, the PDU session establishment accept message in the session identifier, and sending the session identifier to the user equipment.

In an optional implementation, a network side device is further provided. For example, the AGF notifies the user equipment that a newly created PDU session is related to which access session. Details are as follows: The PDU session establishment accept message includes the session identifier, and the session identifier is identification information of the access session related to the PDU session. Alternatively, the PDU session establishment accept message is encapsulated in the session identifier, and the session identifier is identification information of the access session related to the PDU session.

The session identifier included in the session establishment accept message may be any identification information that can identify the access session, or is mapped to the access session, or is mapped to the user equipment.

In an optional implementation, several optional implementation solutions of the session identifier are further provided as follows: The session identifier includes at least one of a MAC address of the AGF, an internet protocol (IP) address of the AGF, a virtual local area network (VLAN) label, a GRE tunnel identifier, a multiprotocol label switching (MPLS) label, a PPPoE session identifier, a MAC address of the user equipment, or an internet protocol (IP) address of the user equipment.

In an optional implementation, a specific implementation solution in which the access session is established between the user equipment and the AGF is further provided as follows: The establishing, by the user equipment, an access session with the AGF includes:

sending, by the user equipment, a PPPoE message or an access session message that includes the session identifier to the AGF, where the PPPoE message is used to establish a PPPoE session, and the PPPoE session is bound to a PDU session corresponding to the session identifier; and the access session message is used to request to establish the access session, and the access session is bound to the PDU session corresponding to the session identifier.

In this embodiment, binding may be considered as obtaining or storing a correspondence between the access session and the PDU session corresponding to the session identifier. The correspondence may be stored by a data structure like a table or any other data structures.

The PPPoE message is a message used to establish the PPPoE session, and includes a PPPoE initiation (PADI) message, a PPPoE discovery (PADO) message, a PPPoE request (PADR) message, a PPPoE confirmation (PADS) message, a PPPoE terminate (PADT) message, a link control protocol (LCP) message, and an internet protocol control protocol (IPCP) message. The message may be sent by using a user plane, or may be sent by using the PPPoE message included in a NAS request message.

In an optional implementation, a solution in which data is sent after the PDU session and the access session are established is further provided as follows: The method further includes:

sending, by the user equipment, a data packet of the PDU session, and encapsulating the data packet by using a session identifier corresponding to the PDU session.

Because the data packet is encapsulated by using the session identifier, the AGF can determine a PDU session to which the data packet belongs, to continue a subsequent data packet forwarding and processing procedure.

In an optional implementation, a specific encapsulation manner of a data packet of the PDU session is further provided. Details are as follows: The method further includes:

determining, by the user equipment, a PPPoE session identifier corresponding to the PDU session, encapsulating a data packet of the PDU session in the PPPoE session identifier, and sending the PPPoE session identifier to the AGF; or determining, by the user equipment, a MAC address that is of the AGF and that corresponds to the PDU session or an internet protocol (IP) address that is of the AGF and that corresponds to the PDU session, encapsulating a data packet of the PDU session in the MAC address of the AGF or the internet protocol (IP) address of the AGF, and sending the MAC address of the AGF or the internet protocol (IP) address of the AGF to the AGF; or determining, by the user equipment, a virtual wireless local area network (VLAN) label or a multiprotocol label switching (MPLS) label that corresponds to the PDU session, encapsulating a data packet of the PDU session in the VLAN label, and sending the VLAN label to the AGF; or determining, by the user equipment, a GRE tunnel identifier corresponding to the PDU session, encapsulating a data packet of the PDU session in the GRE tunnel, and sending the GRE tunnel to the AGF; or determining, by the user equipment, a MAC address that is of the user equipment and that corresponds to the PDU session, encapsulating a data packet of the PDU session in the MAC address of the user equipment, and sending the MAC address of the user equipment to the AGE In an optional implementation, an optional implementation solution of the NAS message identifier is further provided. Details are as follows: The NAS message is encapsulated in a layer 2 data packet, and the NAS message identifier includes a virtual local area network (VLAN) label, a MAC address of the AGF, or an Ethernet type; or the NAS message is encapsulated in a layer 3 data packet, and the NAS message identifier includes a user datagram protocol (UDP) port number or a predetermined destination IP address; or if the PPPoE session is established, the NAS message is encapsulated in the PPPoE session, and the NAS message identifier includes the PPPoE session identifier; or if the GRE tunnel is established, the NAS message is encapsulated in the GRE tunnel, and the NAS message identifier includes the GRE tunnel identifier; or the NAS message is encapsulated in an extensible authentication protocol (EAP) message, and the NAS message identifier includes the EAP parameter type; or the NAS message is encapsulated in a predetermined protocol layer, and the NAS message identifier includes information of the predetermined protocol layer.

According to a second aspect, an embodiment of the present disclosure further provides a session management method, including:

receiving, by an access gateway function (AGF), a non-access stratum (NAS) message sent by user equipment, where the NAS message includes a PDU session establishment request message used to request to establish a PDU session;

sending, by the AGF, the NAS message to a mobility management function (AMF); and after receiving a PDU session establishment accept message, sending, by the AGF, the PDU session establishment accept message to the user equipment; and establishing, by the AGF, an access session with the user equipment, where the access session is an access session related to the PDU session.

On the AGF side, the PDU session established by the user equipment and the access session between the AGF and the user equipment are known. In this way, an association relationship can be established between the access session and the PDU session, so that the user equipment accesses a 5G CN through a fixed network.

In an optional implementation, several possible cases of the access session are further provided. Details are as follows: The access session includes:

a point-to-point protocol over Ethernet (PPPoE) session, an L2 Ethernet session, an L3 internet protocol session, or a generic routing encapsulation (GRE) tunnel.

In an optional implementation, an encapsulation manner of the NAS is further provided. Details are as follows: The NAS message is encapsulated in a NAS message identifier, and the NAS message identifier is used to identify the NAS message.

In this embodiment, the NAS message is encapsulated in the NAS message identifier. In this case, after receiving the NAS message, the AGF may identify the NAS message based on the NAS message.

In an optional implementation, an optional implementation solution in which the NAS is received is further provided. Details are as follows: Before the receiving, by an access gateway function (AGF), a non-access stratum (NAS) message sent by user equipment, the method further includes: establishing a PPPoE session between the user equipment and the AGF; and before the receiving, by an access gateway function (AGF), a non-access stratum (NAS) message sent by user equipment includes: receiving the NAS message encapsulated in the PPPoE session, where the PPPoE session identifier is the NAS message identifier; or the receiving, by an access gateway function (AGF), a non-access stratum (NAS) message sent by user equipment includes: receiving, by using a message in any one of a PPPoE discovery process, a internet Protocol control protocol (IPCP) process, and a link control protocol (LCP) process, the NAS message sent by the user equipment to the AGF.

In the foregoing two optional implementations, in the former implementation, the PPPoE session is first established to transmit the NAS message. In this case, the PPPoE session may be used to notify the AGF that the NAS message is sent. Therefore, identification information may not need to be newly added. In the latter implementation, several application scenarios in which the NAS message is sent are provided.

In an optional implementation, a specific solution in which the PDU session establishment request message is sent is further provided as follows: The PDU session establishment request message further includes a session identifier, and the session identifier is identification information of the access session related to the PDU session.

In this embodiment, the PDU session establishment request message is used to carry the session identifier. In this way, the AGF may determine, based on the session identifier, which access session is related to the PDU session being requested to be established.

In an optional implementation, a specific implementation solution in which the access session is established between the user equipment and the AGF is further provided as follows: The establishing, by the AGF, an access session with the user equipment includes:

receiving, by the AGF, a PPPoE message or an access session message that includes the session identifier and that is sent by the user equipment, where the PPPoE message is used to establish a PPPoE session, and the PPPoE session is bound to a PDU session corresponding to the session identifier; and the access session message is used to establish the access session, and the access session is bound to the PDU session corresponding to the session identifier.

In this embodiment, binding may be considered as obtaining or storing a correspondence between the access session and the PDU session corresponding to the session identifier. The correspondence may be stored by using a data structure like a table or any other data structures.

In an optional implementation, several possible implementation solutions of the session identifier are further provided as follows: The session identifier includes at least one of a MAC address of the AGF, an internet protocol (IP) address of the AGF, a virtual local area network (VLAN) label, a GRE tunnel identifier, a multiprotocol label switching (MPLS) label, a PPPoE session identifier, a MAC address of the user equipment, or an internet protocol (IP) address of the user equipment.

The method further includes:

sending, by the AGF to the user equipment by using the PPPoE message, a received internet protocol (IP) address that is of the user equipment and that is assigned by an SMF.

In an optional implementation, an implementation solution in which data is transmitted after the PDU session and the access session are established is further provided. Details are as follows: The method further includes:

receiving a data packet that is of the PDU session and that is sent by the user equipment, where the data packet carries a session identifier; and sending the data packet to a PDU session corresponding to the session identifier.

Because the session identifier may be used to notify the AGF of a PDU session to which the data packet is mapped, the AGF may forward the data packet based on the session identifier.

In an optional implementation, a specific encapsulation solution of the data packet is further provided as follows: After the access session is mapped to the PDU session, the method further includes:

receiving the data packet sent by the user equipment; and encapsulating the data packet in a PPPoE session identifier, and determining, based on the PPPoE session identifier, the PDU session corresponding to the data packet; or encapsulating the data packet in a MAC address of the AGF or an internet protocol (IP) address of the AGF, and determining, based on the MAC address of the AGF or the internet protocol (IP) address of the AGF, the PDU session corresponding to the data packet; or encapsulating the data packet in a virtual wireless local area network (VLAN) label or a multiprotocol label switching (MPLS) label, and determining, based on the VLAN label or the multiprotocol label switching (MPLS) label, the PDU session corresponding to the data packet; or encapsulating the data packet in a GRE tunnel, and determining, based on the GRE tunnel identifier, the PDU session corresponding to the data packet; or encapsulating the data packet in a MAC address of the user equipment or an internet protocol (IP) address of the user equipment, and determining, based on the MAC address of the user equipment or the IP address of the user equipment, the PDU session corresponding to the data packet.

According to a third aspect, an embodiment of the present disclosure further provides a session management method, including:

receiving, by a session management function SMF, a PDU session establishment request message, where the PDU session establishment request message is used to request to establish a PDU session; and obtaining, by the SMF, a session identifier corresponding to the PDU session, and sending the session identifier to an access gateway function (AGF) or user equipment, where the session identifier is identification information of an access session related to the PDU session.

In this embodiment, the SMF establishes the PDU session for the user equipment, and obtains the session identifier. After notifying the AGF or the user equipment, the SMF may instruct the user equipment and the AGF to determine, based on the session identifier, an access session to which the PDU session is mapped.

In an optional implementation, a specific implementation solution in which the session identifier is sent to the AGF or the user equipment is further provided as follows: The obtaining a session identifier corresponding to the PDU session, and sending the session identifier to an AGF or user equipment includes:

after receiving the session identifier assigned by the AGF, sending, by the SMF, a PDU session establishment accept message to the user equipment, where the PDU session establishment accept message includes the session identifier; or after receiving the session identifier assigned by the user equipment, sending, by the SMF, session management (SM) information to the AGF, where the SM information includes the session identifier.

In an optional implementation, an optional implementation solution of the session identifier is further provided as follows: The session identifier includes:

at least one of a MAC address of the AGF, an internet protocol (IP) address of the AGF, a virtual local area network (VLAN) label, a GRE tunnel identifier, a multiprotocol label switching (MPLS) label, a point-to-point protocol over Ethernet (PPPoE) session identifier, a MAC address of the user equipment, and an internet protocol (IP) address of the user equipment.

In an optional implementation, a specific implementation solution in which the SMF sends the SM information to the AGF to notify the AGF of the session identifier is further provided as follows: The sending SM information to the AGF includes:

sending, by the SMF, the SM information to the AGF, where the SM information includes at least one of a virtual local area network (VLAN) label, a GRE tunnel identifier, a multiprotocol label switching (MPLS) label, a PPPoE session identifier, an internet protocol (IP) address of the user equipment, or a MAC address of the user equipment.

In an optional implementation, a specific implementation solution in which the session identifier is notified to the user equipment by using the PDU session establishment accept message is further provided as follows: The method further includes:

sending, by the SMF, a PDU session establishment accept message to the user equipment, where the PDU session establishment accept message includes at least one of a MAC address of the AGF, an internet protocol (IP) address of the AGF, a virtual local area network (VLAN) label, a GRE tunnel identifier, a multiprotocol label switching (MPLS) label, or a PPPoE session identifier.

According to a fourth aspect, an embodiment of the present disclosure further provides user equipment, including:

a sending unit, configured to send a non-access stratum (NAS) message to an access gateway function (AGF), where the NAS message includes a PDU session establishment request message used to request to establish a PDU session;

a receiving unit, configured to receive a PDU session establishment accept message returned by a network side device; and a session establishment unit, configured to establish an access session with the AGF, where the access session is an access session related to the PDU session.

In an optional implementation, the access session includes:

a point-to-point protocol over Ethernet (PPPoE) session, an L2 Ethernet session, an L3 internet protocol session, or a generic routing encapsulation (GRE) tunnel.

In an optional implementation, the NAS message is encapsulated in a NAS message identifier, and the NAS message identifier is used to identify the NAS message.

In an optional implementation, the session establishment unit is further configured to: before the user equipment sends the non-access stratum (NAS) message to the AGF, establish a PPPoE session between the user equipment and the AGE That a sending unit is configured to send a non-access stratum (NAS) message to an AGF includes: the sending unit is configured to encapsulate the NAS message in the PPPoE session, where the PPPoE session identifier is the NAS message identifier.

Alternatively, that a sending unit is configured to send a non-access stratum (NAS) message to an AGF includes: the sending unit is configured to send the NAS message to the AGF by using a message in any one of a PPPoE discovery process, a network control protocol IPCP process, and a link control protocol (LCP) process.

In an optional implementation, the PDU session establishment request message further includes a session identifier, and the session identifier is identification information of the access session related to the PDU session.

In an optional implementation, the receiving unit is further configured to receive PDU session information sent by the SMF.

The sending unit is further configured to send a session identifier assigned to the PDU session to the SMF, so that the SMF adds the session identifier to the PDU session establishment accept message, and sends the PDU session establishment accept message to the user equipment.

Alternatively, the receiving unit is further configured to receive the PDU session establishment accept message sent by the SMF, so that the AGF assigns a session identifier to the PDU session.

The sending unit is further configured to: encapsulate the PDU session establishment accept message in the session identifier, and send the session identifier to the user equipment.

In an optional implementation, the PDU session establishment accept message includes the session identifier, and the session identifier is identification information of the access session related to the PDU session. Alternatively, the PDU session establishment accept message is encapsulated in the session identifier, and the session identifier is identification information of the access session related to the PDU session.

In an optional implementation, the session identifier includes at least one of a MAC address of the AGF, an internet protocol (IP) address of the AGF, a virtual local area network (VLAN) label, a GRE tunnel identifier, a multiprotocol label switching (MPLS) label, a PPPoE session identifier, a MAC address of the user equipment, or an internet protocol (IP) address of the user equipment.

In an optional implementation, that a session establishment unit is configured to establish an access session with the AGF includes: the session establishment unit is configured to send, by using the sending unit, a PPPoE message or an access session message that includes the session identifier to the AGF, where the PPPoE message is used to establish a PPPoE session, and the PPPoE session is bound to a PDU session corresponding to the session identifier; and the access session message is used to request to establish the access session, and the access session is bound to the PDU session corresponding to the session identifier.

In an optional implementation, the sending unit is further configured to: send a data packet of the PDU session, and encapsulate the data packet by using a session identifier corresponding to the PDU session.

In an optional implementation, the user equipment further includes:

an encapsulation unit, configured to: determine a PPPoE session identifier corresponding to the PDU session, encapsulate a data packet of the PDU session in the PPPoE session identifier, and send the PPPoE session identifier to the AGF; or determine a MAC address that is of the AGF and that corresponds to the PDU session or an internet protocol (IP) address that is of the AGF and that corresponds to the PDU session, encapsulate a data packet of the PDU session in the MAC address of the AGF or the internet protocol (IP) address of the AGF, and send the MAC address of the AGF or the internet protocol (IP) address of the AGF to the AGF; or determine a virtual wireless local area network (VLAN) label or a multiprotocol label switching (MPLS) label that corresponds to the PDU session, encapsulate a data packet of the PDU session in the VLAN label or the multiprotocol label switching (MPLS) label, and send the VLAN label or the multiprotocol label switching (MPLS) label to the AGF; or determine a MAC address that is of the user equipment and that corresponds to the PDU session, encapsulate a data packet of the PDU session in the MAC address of the user equipment, and send the MAC address of the user equipment to the AGE In an optional implementation, the NAS message is encapsulated in a layer 2 data packet, and the NAS message identifier includes a virtual local area network (VLAN) label, a MAC address of the AGF, or an Ethernet type.

Alternatively, the NAS message is encapsulated in a layer 3 data packet, and the NAS message identifier includes a user datagram protocol (UDP) port number or a predetermined destination IP address.

Alternatively, if the PPPoE session is established, the NAS message is encapsulated in the PPPoE session, and the NAS message identifier includes the PPPoE session identifier.

Alternatively, if the GRE tunnel is established, the NAS message is encapsulated in the GRE tunnel, and the NAS message identifier includes the GRE tunnel identifier.

Alternatively, the NAS message is encapsulated in an extensible authentication protocol (EAP) message, and the NAS message identifier includes the EAP parameter type.

Alternatively, the NAS message is encapsulated in a predetermined protocol layer, and the NAS message identifier includes information of the predetermined protocol layer.

According to a fifth aspect, an embodiment of the present disclosure further provides an access gateway function device, including:

a receiving unit, configured to receive a non-access stratum (NAS) message sent by user equipment, where the NAS message includes a PDU session establishment request message used to request to establish a PDU session;

a sending unit, configured to send the NAS message to a mobility management function (AMF), where the receiving unit is further configured to receive a PDU session establishment accept message; and the sending unit is further configured to: after the receiving unit receives the PDU session establishment accept message, send the PDU session establishment accept message to the user equipment; and a session establishment unit, configured to establish an access session with the user equipment, where the access session is an access session related to the PDU session.

In an optional implementation, the access session includes:

a point-to-point protocol over Ethernet (PPPoE) session, an L2 Ethernet session, an L3 internet protocol session, or a generic routing encapsulation (GRE) tunnel.

In an optional implementation, the NAS message is encapsulated in a NAS message identifier, and the NAS message identifier is used to identify the NAS message.

In an optional implementation, the session establishment unit is further configured to: before the receiving unit receives the non-access stratum (NAS) message sent by the user equipment, establish a PPPoE session between the user equipment and the AGE That a receiving unit is configured to receive a non-access stratum (NAS) message sent by user equipment includes: the receiving unit is configured to receive the NAS message encapsulated in the PPPoE session, where the PPPoE session identifier is the NAS message identifier.

Alternatively, that a receiving unit is configured to receive a non-access stratum (NAS) message sent by user equipment includes: the receiving unit is configured to receive, by using a message in any one of a PPPoE discovery process, a network control protocol IPCP process, and a link control protocol (LCP) process, the NAS message sent by the user equipment to the AGF.

In an optional implementation, the PDU session establishment request message further includes a session identifier, and the session identifier is identification information of the access session related to the PDU session.

In an optional implementation, that a session establishment unit is configured to establish an access session with the user equipment includes:

the session establishment unit is configured to receive, by using the receiving unit, a PPPoE message or an access session message that includes the session identifier and that is sent by the user equipment, where the PPPoE message is used to establish a PPPoE session, and the PPPoE session is bound to a PDU session corresponding to the session identifier; and the access session message is used to establish the access session, and the access session is bound to the PDU session corresponding to the session identifier.

In an optional implementation, the session identifier includes at least one of a MAC address of the AGF, an internet protocol (IP) address of the AGF, a virtual local area network (VLAN) label, a GRE tunnel identifier, a multiprotocol label switching (MPLS) label, a PPPoE session identifier, a MAC address of the user equipment, or an internet protocol (IP) address of the user equipment.

The sending unit is further configured to send, to the user equipment by using the PPPoE message, a received internet protocol (IP) address that is of the user equipment and that is assigned by an SMF.

In an optional implementation, the receiving unit is further configured to receive a data packet that is of the PDU session and that is sent by the user equipment, where the data packet carries a session identifier.

The sending unit is further configured to send the data packet to a PDU session corresponding to the session identifier.

In an optional implementation, the receiving unit is further configured to: after the access session is mapped to the PDU session, receive the data packet sent by the user equipment.

If the data packet is encapsulated in a PPPoE session identifier, the session establishment unit is configured to determine, based on the PPPoE session identifier, the PDU session corresponding to the data packet.

Alternatively, if the data packet is encapsulated in a MAC address of the AGF or an internet protocol (IP) address of the AGF, the session establishment unit is configured to determine, based on the MAC address of the AGF or the internet protocol (IP) address of the AGF, the PDU session corresponding to the data packet.

Alternatively, if the data packet is encapsulated in a virtual wireless local area network (VLAN) label or a multiprotocol label switching (MPLS) label, the session establishing unit is configured to determine, based on the VLAN label or the multiprotocol label switching (MPLS) label, the PDU session corresponding to the data packet.

Alternatively, the data packet is encapsulated in a GRE tunnel, and the session establishment unit is configured to determine, based on the GRE tunnel identifier, the PDU session corresponding to the data packet.

Alternatively, if the data packet is encapsulated in a MAC address of the user equipment or an internet protocol (IP) address of the user equipment, the session establishment unit is configured to determine, based on the MAC address of the user equipment or the IP address of the user equipment, the PDU session corresponding to the data packet.

According to a sixth aspect, an embodiment of the present disclosure further provides a session management function device, including:

a receiving unit, configured to receive a PDU session establishment request message, where the PDU session establishment request message is used to request to establish a PDU session;

an identifier obtaining unit, configured to obtain a session identifier corresponding to the PDU session, where the session identifier is identification information of an access session related to the PDU session; and a sending unit, configured to send the session identifier to an access gateway function (AGF) or user equipment.

In an optional implementation, the obtaining a session identifier corresponding to the PDU session, and sending the session identifier to an AGF or user equipment includes:

The identifier obtaining unit is configured to receive the session identifier assigned by the AGF. The sending unit is configured to send a PDU session establishment accept message to the user equipment, where the PDU session establishment accept message includes the session identifier.

Alternatively, the identifier obtaining unit is configured to receive the session identifier assigned by the user equipment. The sending unit is configured to send SM information to the AGF, where the SM information includes the session identifier.

In an optional implementation, the session identifier includes:

at least one of a MAC address of the AGF, an internet protocol (IP) address of the AGF, a virtual local area network (VLAN) label, a GRE tunnel identifier, a multiprotocol label switching (MPLS) label, a point-to-point protocol over Ethernet (PPPoE) session identifier, a MAC address of the user equipment, and an internet protocol (IP) address of the user equipment.

In an optional implementation, that the sending unit is configured to send SM information to the AGF includes: the sending unit is configured to send the SM information to the AGF, where the SM information includes at least one of a virtual local area network (VLAN) label, a GRE tunnel identifier, a multiprotocol label switching (MPLS) label, a PPPoE session identifier, an internet protocol (IP) address of the user equipment, or a MAC address of the user equipment.

In an optional implementation, the sending unit is further configured to send a PDU session establishment accept message to the user equipment, where the PDU session establishment accept message includes at least one of a MAC address of the AGF, an internet protocol (IP) address of the AGF, a virtual local area network (VLAN) label, a GRE tunnel identifier, a multiprotocol label switching (MPLS) label, or a PPPoE session identifier.

According to a seventh aspect, an embodiment of the present disclosure further provides an electronic device, including an input/output device, a processor, and a memory.

The memory stores an executable instruction, and the processor executes the executable instruction to implement any method procedure provided in the embodiments of the present disclosure.

According to an eighth aspect, an embodiment of the present disclosure further provides a computer storage medium. The computer storage medium includes an executable instruction, and when the executable instruction is executed, any method procedure provided in the embodiments of the present disclosure is implemented.

According to a ninth aspect, an embodiment of the present disclosure further provides a computer program product. The computer program product includes an executable instruction, and when the executable instruction is executed, any method procedure provided in the embodiments of the present disclosure is implemented.

BRIEF DESCRIPTION OF DRAWINGS

To describe the technical solutions in the embodiments or the background of the present disclosure more clearly, the following describes the accompanying drawings required for the embodiments or the background of the present disclosure.

DESCRIPTION OF EMBODIMENTS

The embodiments of the present disclosure are described below with reference to the accompanying drawings in the embodiments of the present disclosure.

Figure 1:
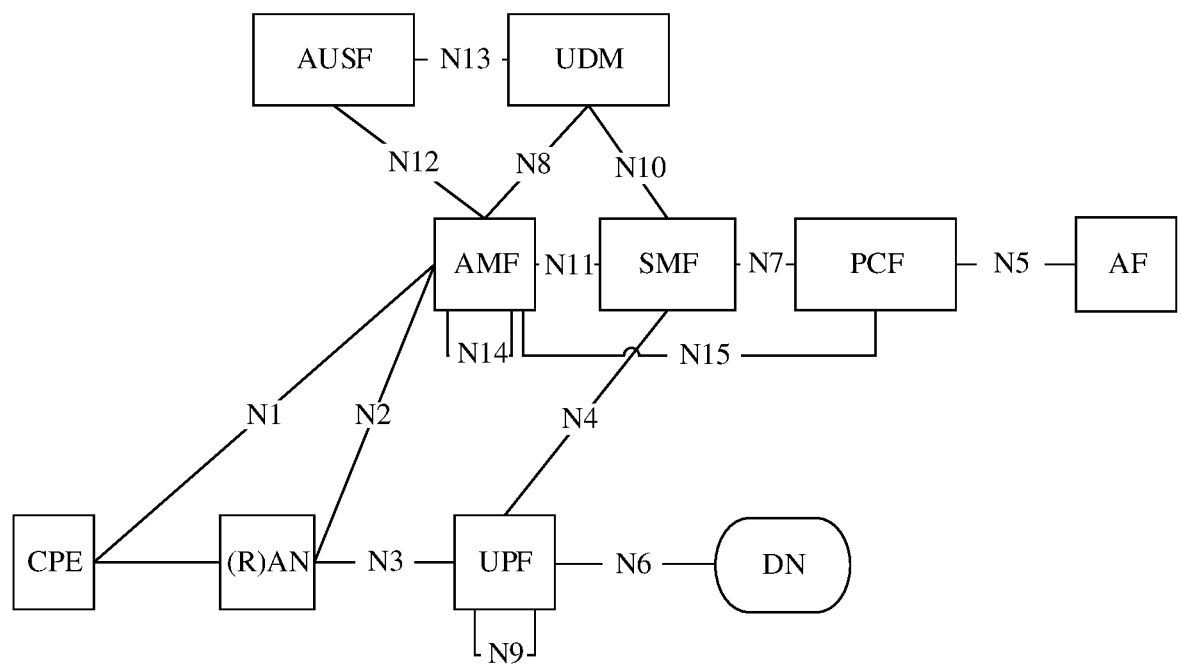
FIG. 1 is a schematic architectural diagram of a 5G system according to an embodiment of the present disclosure.

FIG. 1 shows a non-limiting example 5G communications system. In FIG. 1, the 5G communications system includes customer-premises equipment (CPE), a radio access network (RAN) or an access network (AN), a user plane function (UPF), a data network (DN), an AMF, an SMF, a policy control function (PCF), an application function (AF), an authentication server function (AUSF), and a unified data management (UDM). Interfaces N1 to N15 are respectively used for communication.

Figure 2:
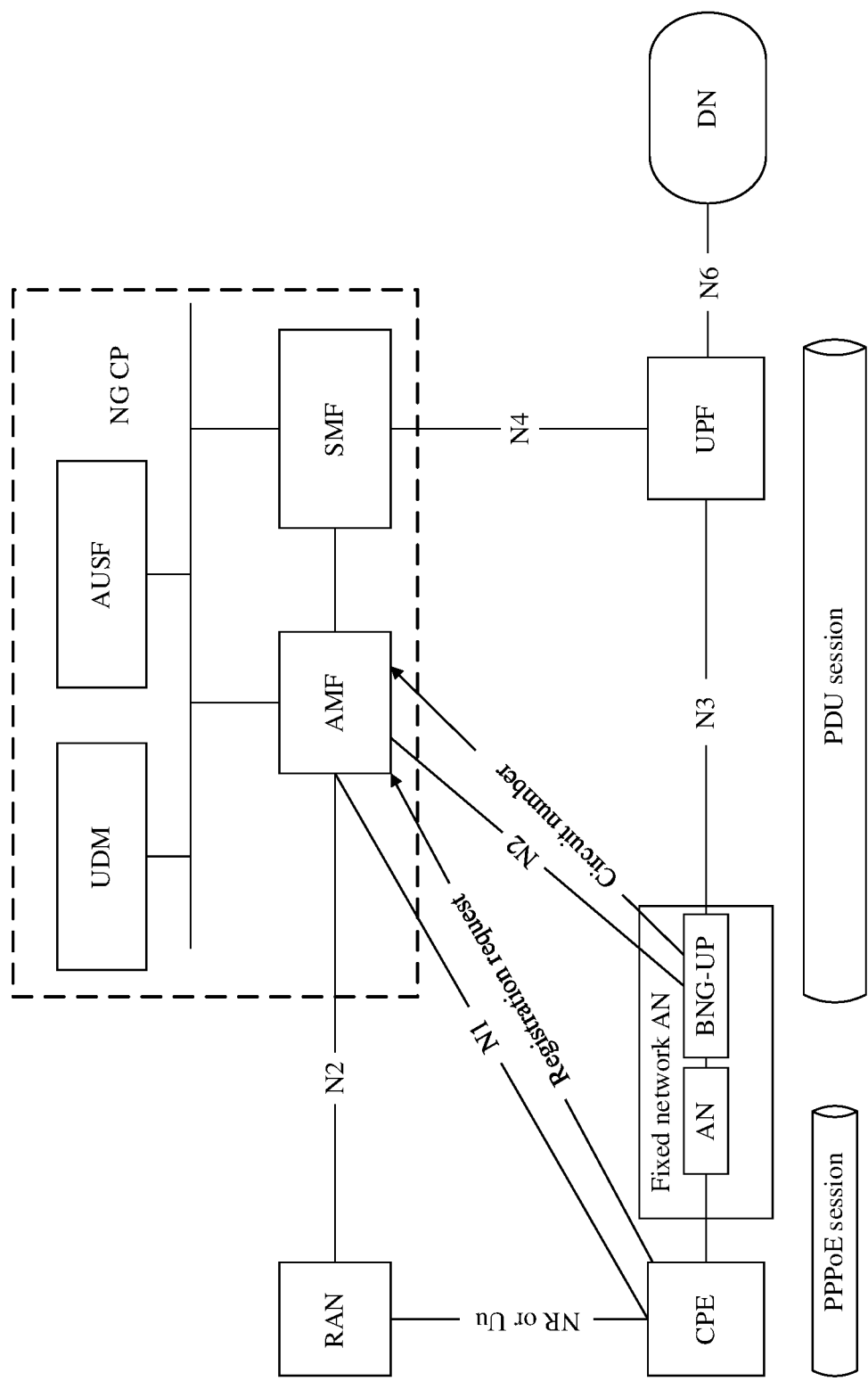
FIG. 2 is a schematic architectural diagram of a system of a 5G converged core network according to an embodiment of the present disclosure.

FIG. 2 is a schematic diagram of a system of a 5G converged core network according to an embodiment of the present disclosure. Referring to a structure of the 5G communications system in FIG. 1, in FIG. 2, a dashed-line box part shows a next generation control plane network element function (NG CP). A fixed network AN is newly added to the access network side. In FIG. 2, the CPE may alternatively be UE, an RG, an FNRG, or a wireless fidelity (wifi) access point (AP). A broadband network gateway-user plane function (BNG-UP) communicates with the UPF through an interface N3. The CPE and the RAN may communicate with each other by using a New Radio (NR) interface or Uu interface. FIG. 2 includes a PPPoE session and a packet data unit (PDU) session. FIG. 2 further shows that the CPE sends a registration request to the AMF. In FIG. 2, the fixed network user plane is terminated at an AGF, and remains independent of a fixed network and a CN-UPF in 5G.

The AMF device, the SMF device, the UPF device, and the PCF device may be briefly referred to as an AMF, an SMF, a UPF, and a PCF respectively.

Figure 3A:
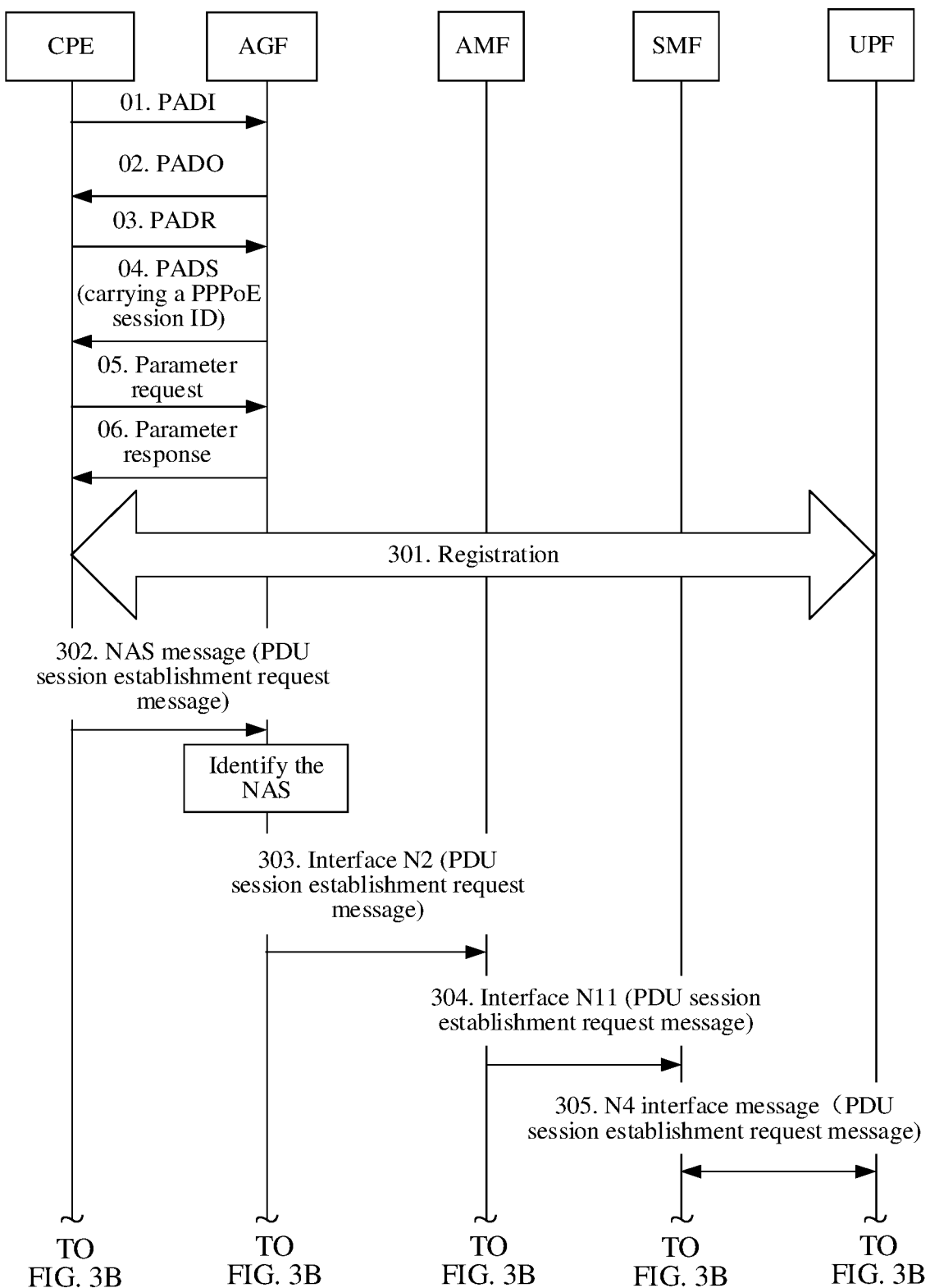
FIG. 3A and FIG. 3B illustrate a schematic flowchart of a method according to an embodiment of the present disclosure.
Figure 3B:
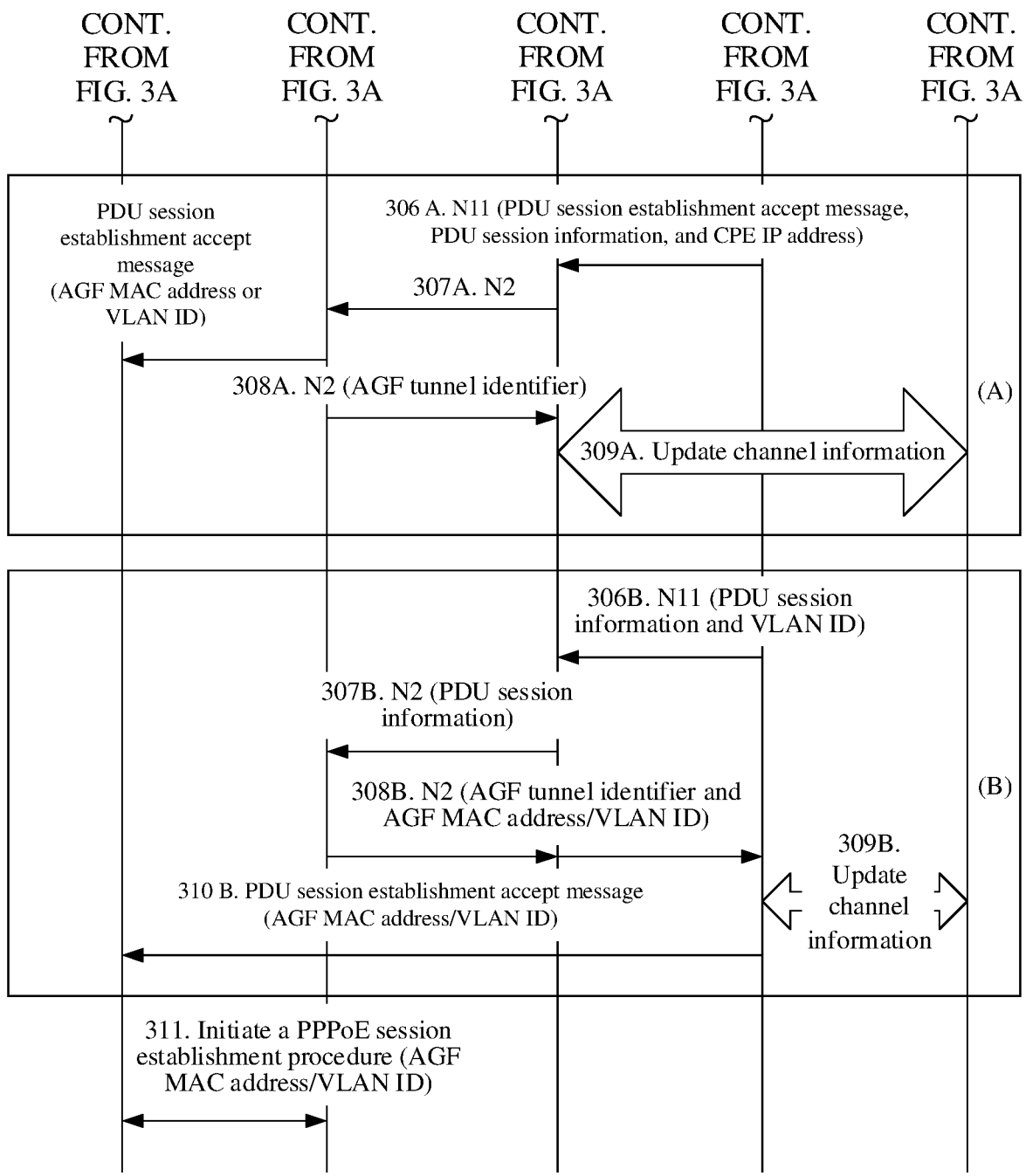

As shown in FIG. 3A and FIG. 3B, based on the system of the 5G converged core network shown in FIG. 2, the following provides a schematic flowchart in which user equipment accesses a 5G CN through a fixed network. In FIG. 3A and FIG. 3B, an AGF is an upper layer convergence point in the AN, is deployed on the access network side in the fixed network, and is mapped to the fixed network AN in FIGS. 2.

01 to 06 are a PPPoE session establishment procedure. A PPPoE connection between the CPE and the AGF is established in the PPPoE session establishment procedure. An authentication process may be omitted. In the PPPoE session establishment procedure, the AGF assigns a PPPoE session ID to the CPE, and stores the PPPoE session ID as a non-access stratum (NAS) session of the CPE, namely, a PPPoE session dedicated to transmit a NAS message.

Specifically, 01 to 06 are respectively as follows:

01. The CPE sends a PPPoE initiation (PADI) message to the AGF.

02. The AGF returns a PPPoE offer (PADO) message to the CPE.

03. The CPE sends a PPPoE request (PADR) message to the AGF.

04. The AGF returns a PPPoE session confirmation (PADS) message to the CPE, where the PADS message carries the PPPoE session ID.

05. The CPE sends a parameter request to the AGF.

06. The AGF returns a parameter response to the CPE.

A more detailed PPPoE session establishment procedure may be performed in compliance with a related protocol specification.

Specifically, after the CPE establishes the PPPoE session, a specific procedure is as follows:

301. The CPE initiates a registration procedure.

In this step, the CPE sends a registration request message to the AMF by using the PPPoE session for the NAS, to initiate the registration procedure. In other words, the CPE sends the registration request message to the AMF. The registration request message is encapsulated in a first PPPoE session by using the NAS message.

The NAS message may include a PPPoE session ID, a virtual local area network (VLAN) ID, or a special IP address, so that the AGF identifies the NAS message. The following uses an example in which the NAS message includes the PPPoE session ID for description.

The AGF identifies the NAS message based on the PPPoE session ID, and then the AGF sends the NAS message to the AMF. Then, the network side completes the registration procedure of the CPE.

The NAS message is sent in many other manners, and another optional implementation solution is provided in the present disclosure. As an example of this application, in this embodiment, a manner that is included in the NAS message and that is used by the AGF to identify the NAS message is not limited in embodiments of the present disclosure.

302. The CPE triggers a PDU session establishment procedure based on a service requirement.

The CPE sends a PDU session establishment request message to the AGF The PDU session establishment request message includes parameters such as a PDU session identifier (PDU session ID) and a type identifier. The PDU session establishment request message is in the NAS message, and is sent to the AGF by using the PPPoE session for the NAS.

The CPE may encapsulate the PPPoE session ID, the VLAN ID, the special IP address, or a special MAC address in the NAS message, so that the AGF identifies the NAS message. For example, the PPPoE session ID or the VLAN ID is encapsulated in an L2 message header of the NAS message. If a same effect can be achieved in another manner in which the AGF identifies the NAS message, this is not limited in this embodiment of the present disclosure.

303. The AGF identifies the NAS message based on the PPPoE session ID, and forwards the PDU session establishment request message to the AMF through an interface N2.

Based on the foregoing descriptions, in this step, the NAS message may alternatively be identified based on the VLAN ID. Optionally, the AGF obtains and stores the VLAN ID in the L2 message header.

304. The AMF forwards the PDU session establishment request message to the SMF by using an N11 interface message.

305. The SMF forwards the PDU session establishment request message to the UPF by using an N4 interface message. Therefore, the network side establishes a PDU session.

In this embodiment, the AGF assigns the special MAC address of the AGF to the CPE and establishes a binding relationship between the MAC address of the AGF and the PDU session by one of the following two solutions (A) and (B).

The solution (A) is detailed as follows:

306A. The SMF sends an N11 interface reply message, where the N11 interface reply message includes a PDU session establishment accept message and PDU session information.

The PDU session establishment accept message may include a QoS policy, a service continuity mode, and the like. The PDU session information may include a PDU session identifier, a QoS file, and core network tunnel identification information.

In addition, the SMF assigns an IP address of the CPE to the CPE, and sends the IP address of the CPE to the AGF by using the AMF based on the type identifier. In other words, the SMF adds the IP address of the CPE to session management (SM) information based on the type identifier, and sends the session management information to the AGF.

307A. The AMF sends, to the AGF through the interface N2, the PDU session establishment accept message and the PDU session information that are received in step 306A, and the AGF sends the PDU session establishment accept message to the CPE.

Specifically, the AGF parses the PDU session information to obtain the PDU session identifier. The AGF assigns a special AGF MAC address to the PDU session, and encapsulates the PDU session establishment accept message by using the MAC address as an AGF source address. The AGF MAC address herein is special because a binding relationship is established between the AGF MAC address and the PDU session, and may also be referred to as a dedicated AGF MAC address.

Herein, the CPE may obtain, from an L2 source MAC address in the PDU session establishment accept message, the AGF MAC address corresponding to the PDU session. The CPE may store a correspondence between the PDU session identifier and the special AGF MAC address.

In addition, the AGF may obtain the PDU session identifier and the IP address of the CPE, and the AGF establishes a binding relationship between the PDU session ID and the CPE IP address. Subsequently, the AGF may identify a correspondence between the CPE IP address and the PDU session based on the CPE IP address.

Optionally, the AGF may alternatively set or update the previously stored VLAN ID. Specifically, the AGF adds the VLAN ID to the L2 message header, and sends the L2 message header to a Fixed Access Network (FAN) or the CPE. The FAN or the CPE stores a correspondence between the VLAN ID and the PDU session that are sent by the AGF The AGF may set the VLAN ID when the FAN does not previously set the VLAN ID, and the AGF updates the VLAN ID when the VLAN ID previously exists.

308A. The AGF may further store the core network side tunnel identification information in the PDU session information, and assign a tunnel identifier of the AGF, in other words, assign an AGF tunnel identifier. Then, the AGF sends the AGF tunnel identifier to the AMF by using an N2 interface message.

309A. The AMF forwards the AGF tunnel identifier to the SMF, and the SMF forwards the AGF tunnel identifier to the UPF, to update tunnel information. Therefore, a user plane tunnel establishment procedure between the UPF and the AGF is completed.

The solution (B) is detailed as follows:

306B. The SMF sends an N11 interface reply message, where the N11 interface reply message includes PDU session information.

The PDU session information may include a PDU session identifier, a QoS file, core network tunnel identification information, and the like. In this step, the SMF may further assign an IP address to the CPE, and then send the IP address to the AGF A manner in which the SMF sends the CPE IP address to the AGF may be obtained according to an indication of the type identifier.

307B. The AMF sends the PDU session information to the AGF The AGF assigns an AGF tunnel identifier. In addition, the AGF obtains the PDU session identifier in the PDU session information, and the AGF assigns a special AGF MAC address to the PDU session.

308B. The AGF sends the assigned AGF tunnel identifier and special AGF MAC address to the AMF, and the AMF forwards the assigned AGF tunnel identifier and special AGF MAC address to the SMF In addition, in this step, the AGF may further send the VLAN ID to the AMF, and then the AMF forwards the VLAN ID to the SMF.

309B. The SMF sends the AGF tunnel identifier to the UPF, to update tunnel information.

310B. The SMF generates a PDU session establishment accept message, and sends the PDU session establishment accept message to the CPE by using the AMF and the AGF The PDU session establishment accept message includes an AGF MAC address, and may further include a PDU session identifier.

The CPE obtains, from the PDU session establishment accept message, the AGF MAC address corresponding to the PDU session. The CPE stores a correspondence between the PDU session identifier and the AGF MAC address. In this embodiment, a correspondence between the PDU session and an access session is stored by using the AGF MAC address and the PDU session identifier. Both the PDU session and the access session may be identified by using a plurality of types of identification information, and examples are provided in both this embodiment and the present disclosure. Therefore, the correspondence between the PDU session and the access session is stored in many other manners.

In addition, the SMF may further add a correspondence between the VLAN ID and the PDU session ID to the NAS message, and send the NAS message to the CPE. In this way, the CPE may store the correspondence between the VLAN ID and the PDU session.

311. The CPE initiates a PPPoE session establishment procedure, and the CPE encapsulates a PPPoE message by using at least one of the MAC address that is of the AGF and that corresponds to the PDU session or the VLAN ID that corresponds to the PDU session.

The AGF completes the PPPoE session establishment procedure, and the AGF sends, to the CPE in the PPPoE procedure, the previously received CPE IP address assigned by the SMF. The AGF identifies, based on the AGF MAC address, the VLAN ID, or the CPE IP address, the PDU session corresponding to the PPPoE session. Therefore, the AGF may index a data packet of the CPE to a corresponding PDU session based on at least one of the AGF MAC address, the VLAN ID, the CPE IP address, or the PPPoE session ID, to complete forwarding of a data packet of the PPPoE session to the PDU session. This solution is also applicable to a scenario in which a plurality of PPPoE sessions correspond to a unique PDU session. In this scenario, the CPE repeats step 311, to establish a correspondence between the plurality of PPPoE sessions and the PDU session.

Figure 4:
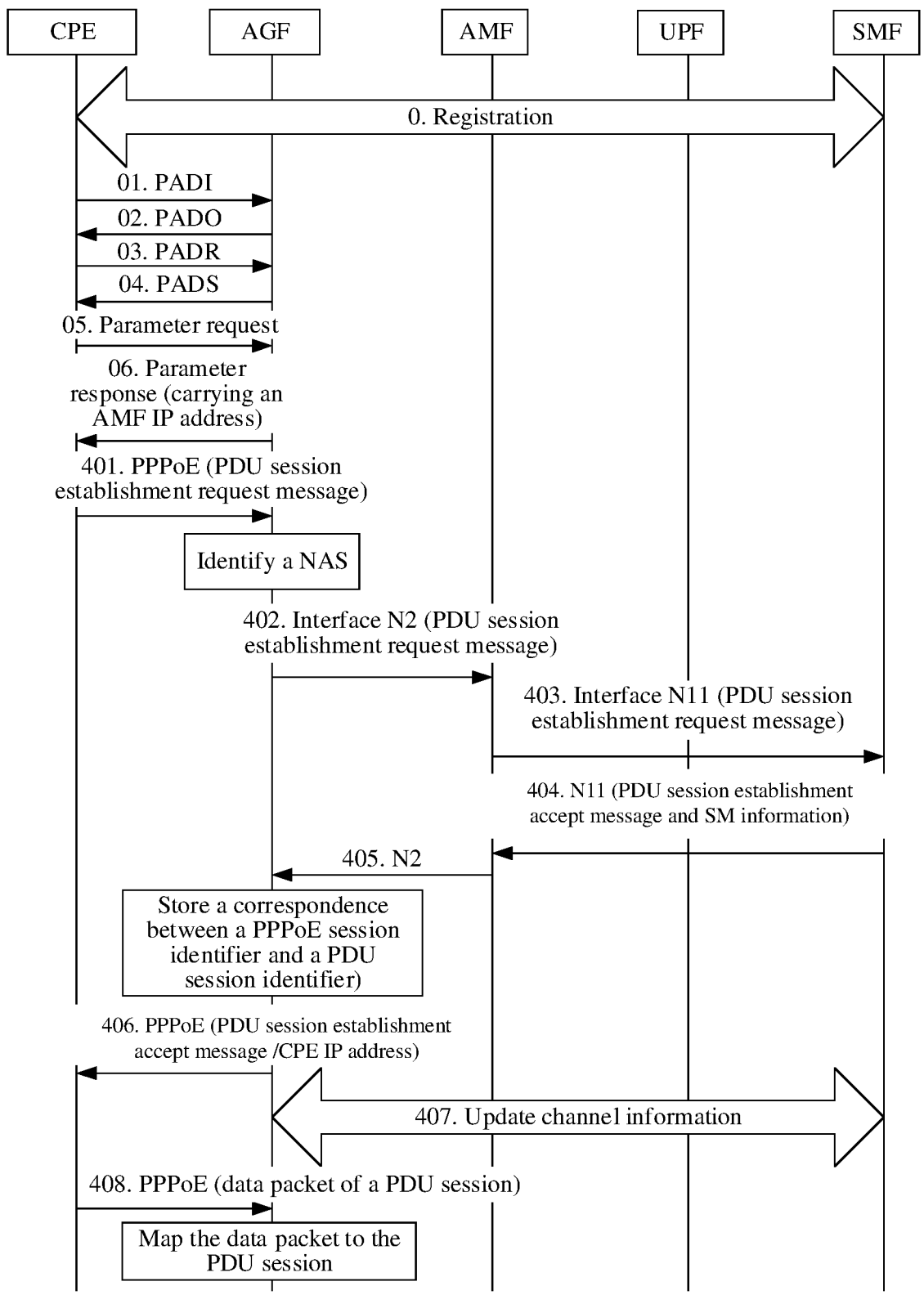
FIG. 4 is a schematic flowchart of a method according to an embodiment of the present disclosure.

As shown in FIG. 4, based on the system of the 5G converged core network shown in FIG. 2, the following provides a schematic flowchart in which user equipment accesses a 5G CN through a fixed network. In FIG. 4, an AGF is an upper layer convergence point in the AN, is deployed on the access network side in the fixed network, and is mapped to the fixed network AN in FIG. 2.

0. The CPE is registered with the network side, and a registration process may be performed in compliance with a related protocol specification.

In 01 to 06, the CPE initiates a PPPoE session establishment procedure based on a service requirement. In the PPPoE session establishment procedure, the AGF assigns an all-0 IP address (0.0.0.0) to the CPE. In addition, the AGF may further set a special server IP address as a NAS encapsulation destination IP address. For example, the AGF uses an AMF IP address as a NAS destination IP address and sends the NAS destination IP address to the CPE in the PPPoE procedure. A PPPoE connection between the CPE and the AGF is established in the PPPoE session establishment procedure. An authentication process may be omitted.

Specifically, 01 to 06 are respectively as follows:
01. The CPE sends a PADI message to the AGF.
02. The AGF returns a PADO message to the CPE.
03. The CPE sends a PADR message to the AGF.
04. The AGF returns a PADS message to the CPE.
05. The CPE sends a parameter request to the AGF.
06. The AGF returns a parameter response to the CPE, where the parameter response carries the AMF IP address.

In this embodiment, a NAS message may be identified by using a special IP address, for example, an AMF IP address or a non-all-0 predetermined IP address, so that the AGF identifies the NAS message. The AGF needs to distinguish between the NAS message and a data packet that are sent by the CPE to the AGF. The data packet is sent to the UPF, and the NAS message is sent to the AMF. The foregoing embodiment further provides a manner in which the NAS message is identified by using a PPPoE session identifier or the like, so that the AGF can identify the NAS message.

A more detailed PPPoE session establishment procedure may be performed in compliance with a related protocol specification. A PPPoE session is established after 01 to 06 are performed.

401. The CPE sends a PDU session establishment request message by using the PPPoE session, and may add a PPPoE session ID or the AMF IP address to the PDU session establishment request message and send the PDU session establishment request message to the AGF.

The CPE sends the PDU session establishment request message to the AGF by using the NAS message. To be specific, the CPE may encapsulate the PDU session establishment request message by using a NAS IP address, and send the PDU session establishment request message to the AGF.

In this step, the PDF request message may include identification information used by the AGF to identify the NAS message, for example, a PPPoE session identifier, a PDU session identifier, and a special destination IP address, such as the foregoing example AMF IP address.

402. The AGF identifies the NAS message, and sends the identified NAS message to the AMF through an interface N2.

The NAS message herein specifically includes the PDU session establishment request message.

403. The AMF sends the PDU session establishment request message to the SMF through an interface N11, to establish a PDU session.

A process of establishing the PDU session may be performed in compliance with a related protocol specification.

In this embodiment, after the SMF receives the PDU session establishment request, the SMF may assign a CPE IP address to the CPE, and the SMF may store a CPE identifier and a correspondence between a PPPoE session ID and a PDU session ID.

404. The SMF sends SM information to the AMF through the interface N11. An N11 interface message may include the SM information and a PDU session establishment accept message.

The SM information may include a PDU session ID, a PPPoE session ID, a QoS file, and the like. The PDU session establishment accept message may include the CPE IP address.

405. The AMF sends the received N11 interface message to the AGF through the interface N2.

The AGF parses the SM information, to obtain and store the correspondence between the PPPoE session ID and the PDU session ID.

406. The AGF forwards the PDU session establishment accept message to the CPE.

Because the PDU session establishment accept message includes the CPE IP address, the CPE may parse the PDU session establishment accept message to obtain the CPE IP address, to obtain an IP address assigned by the SMF to the CPE. The CPE replaces the previously used all-0 IP address with the IP address obtained through parsing.

407. Update tunnel information. For a specific procedure of updating the tunnel information, refer to the above described embodiment.

408. The CPE sends a data packet of the PDU session. The CPE encapsulates the data packet of the PDU session in the PPPoE session corresponding to the PDU session, in other words, encapsulates the data packet in the PPPoE session ID. The AGF obtains the PPPoE session ID after receiving the data packet of the PDU session. The AGF searches for the PDU session ID based on the stored correspondence between the PPPoE session ID and the PDU session ID. The AGF sends the data packet to the PDU session identified by the PDU session ID.

Figure 5:
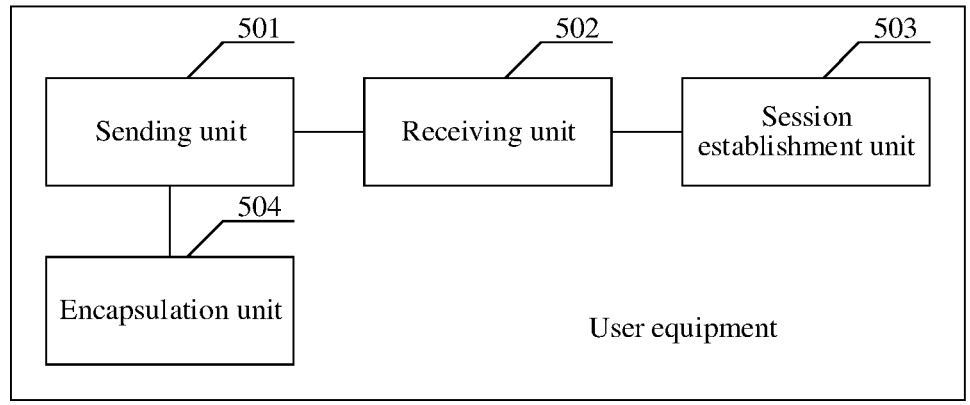
FIG. 5 is a schematic structural diagram of user equipment according to an embodiment of the present disclosure.

An embodiment of the present disclosure further provides user equipment. As shown in FIG. 5, the user equipment includes:

a sending unit 501, configured to send a non-access stratum (NAS) message to an access gateway function (AGF), where the NAS message includes a PDU session establishment request message used to request to establish a PDU session;

a receiving unit 502, configured to receive a PDU session establishment accept message returned by a network side device; and a session establishment unit 503, configured to establish an access session with the AGF, where the access session is an access session related to the PDU session.

Optionally, the access session includes:

a point-to-point protocol over Ethernet (PPPoE) session, an L2 Ethernet session, an L3 internet protocol session, or a generic routing encapsulation (GRE) tunnel.

Optionally, the NAS message is encapsulated in a NAS message identifier, and the NAS message identifier is used to identify the NAS message.

Optionally, the session establishment unit 503 is further configured to: before the user equipment sends the non-access stratum (NAS) message to the AGF, establish a PPPoE session between the user equipment and the AGF. That a sending unit 501 is configured to send a non-access stratum (NAS) message to an AGF includes: the sending unit 501 is configured to encapsulate the NAS message in the PPPoE session, where the PPPoE session identifier is the NAS message identifier.

Alternatively, that a sending unit 501 is configured to send a non-access stratum (NAS) message to an AGF includes: the sending unit 501 is configured to send the NAS message to the AGF by using a message in any one of a PPPoE discovery process, a network control protocol IPCP process, and a link control protocol (LCP) process.

Optionally, the PDU session establishment request message further includes a session identifier, and the session identifier is identification information of the access session related to the PDU session.

Optionally, the PDU session establishment accept message includes the session identifier, and the session identifier is identification information of the access session related to the PDU session. Alternatively, the PDU session establishment accept message is encapsulated in the session identifier, and the session identifier is identification information of the access session related to the PDU session.

Optionally, the session identifier includes at least one of a MAC address of the AGF, an internet protocol (IP) address of the AGF, a virtual local area network (VLAN) label, a GRE tunnel identifier, a multiprotocol label switching (MPLS) label, a PPPoE session identifier, a MAC address of the user equipment, or an internet protocol (IP) address of the user equipment.

Optionally, that a session establishment unit 503 is configured to establish an access session with the AGF includes: the session establishment unit is configured to send, by using the sending unit 501, a PPPoE message or an access session message that includes the session identifier to the AGF, where the PPPoE message is used to establish a PPPoE session, and the PPPoE session is bound to a PDU session corresponding to the session identifier; and the access session message is used to request to establish the access session, and the access session is bound to the PDU session corresponding to the session identifier.

The sending unit 501 is further configured to: send a data packet of the PDU session, and encapsulate the data packet by using a session identifier corresponding to the PDU session.

The user equipment further includes:

an encapsulation unit 504, configured to: determine a PPPoE session identifier corresponding to the PDU session, encapsulate a data packet of the PDU session in the PPPoE session identifier, and send the PPPoE session identifier to the AGF; or determine a MAC address that is of the AGF and that corresponds to the PDU session or an internet protocol (IP) address that is of the AGF and that corresponds to the PDU session, encapsulate a data packet of the PDU session in the MAC address of the AGF or the internet protocol (IP) address of the AGF, and send the MAC address of the AGF or the internet protocol (IP) address of the AGF to the AGF; or determine a GRE tunnel identifier corresponding to the PDU session, encapsulate a data packet of the PDU session in the GRE tunnel, and send the GRE tunnel to the AGF; or determine a virtual wireless local area network (VLAN) label or a multiprotocol label switching (MPLS) label that corresponds to the PDU session, encapsulate a data packet of the PDU session in the VLAN label or the multiprotocol label switching (MPLS) label, and send the VLAN label or the multiprotocol label switching (MPLS) label to the AGF; or determine a MAC address that is of the user equipment and that corresponds to the PDU session, encapsulate a data packet of the PDU session in the MAC address of the user equipment, and send the MAC address of the user equipment to the AGF.

Optionally, the NAS message is encapsulated in a layer 2 data packet, and the NAS message identifier includes a virtual local area network (VLAN) label, a MAC address of the AGF, or an Ethernet type.

Alternatively, the NAS message is encapsulated in a layer 3 data packet, and the NAS message identifier includes a user datagram protocol (UDP) port number or a predetermined destination IP address.

Alternatively, if the PPPoE session is established, the NAS message is encapsulated in the PPPoE session, and the NAS message identifier includes the PPPoE session identifier.

Alternatively, if the GRE tunnel is established, the NAS message is encapsulated in the GRE tunnel, and the NAS message identifier includes the GRE tunnel identifier.

Alternatively, the NAS message is encapsulated in an extensible authentication protocol (EAP) message, and the NAS message identifier includes the EAP parameter type.

Alternatively, the NAS message is encapsulated in a predetermined protocol layer, and the NAS message identifier includes information of the predetermined protocol layer.

Figure 6:
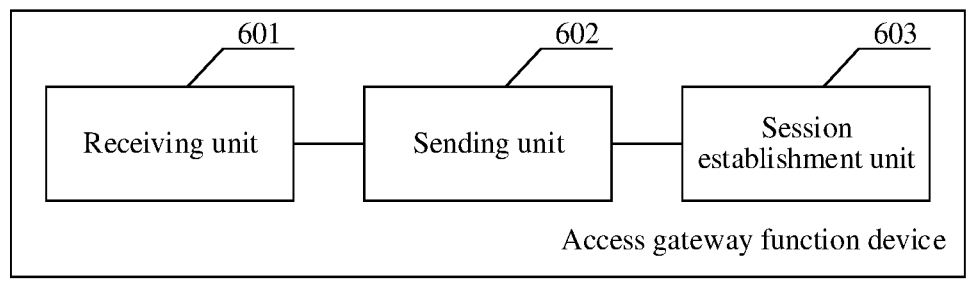
FIG. 6 is a schematic structural diagram of an access gateway function device according to an embodiment of the present disclosure.

An embodiment of the present disclosure further provides an access gateway function device. As shown in FIG. 6, the access gateway function device includes:

a receiving unit 601, configured to receive a non-access stratum (NAS) message sent by user equipment, where the NAS message includes a PDU session establishment request message used to request to establish a PDU session;

a sending unit 602, configured to send the NAS message to a mobility management function (AMF), where the receiving unit 601 is further configured to receive a PDU session establishment accept message; and the sending unit 602 is further configured to: after the receiving unit 601 receives the PDU session establishment accept message, send the PDU session establishment accept message to the user equipment; and a session establishment unit 603, configured to establish an access session with the user equipment, where the access session is an access session related to the PDU session.

Optionally, the access session includes:

a point-to-point protocol over Ethernet (PPPoE) session, an L2 Ethernet session, an L3 internet protocol session, or a generic routing encapsulation (GRE) tunnel.

Optionally, the NAS message is encapsulated in a NAS message identifier, and the NAS message identifier is used to identify the NAS message.

The session establishment unit 603 is further configured to: before the receiving unit 601 receives the non-access stratum (NAS) message sent by the user equipment, establish a PPPoE session between the user equipment and the AGF. That a receiving unit 601 is configured to receive a non-access stratum (NAS) message sent by user equipment includes: the receiving unit 601 is configured to receive the NAS message encapsulated in the PPPoE session, where the PPPoE session identifier is the NAS message identifier.

Alternatively, that a receiving unit 601 is configured to receive a non-access stratum (NAS) message sent by user equipment includes: the receiving unit 601 is configured to receive, by using a message in any one of a PPPoE discovery process, a network control protocol IPCP process, and a link control protocol (LCP) process, the NAS message sent by the user equipment to the AGF.

Optionally, the PDU session establishment request message further includes a session identifier, and the session identifier is identification information of the access session related to the PDU session.

The receiving unit 601 is further configured to receive PDU session information sent by the SMF.

The sending unit 602 is further configured to send a session identifier assigned to the PDU session to the SMF, so that the SMF adds the session identifier to the PDU session establishment accept message, and sends the PDU session establishment accept message to the user equipment.

Alternatively, the receiving unit 601 is further configured to receive the PDU session establishment accept message sent by the SMF, so that the AGF assigns a session identifier to the PDU session.

The sending unit 602 is further configured to: encapsulate the PDU session establishment accept message in the session identifier, and send the session identifier to the user equipment.

Optionally, that a session establishment unit 603 is configured to establish an access session with the user equipment includes:

the session establishment unit 603 is configured to receive, by using the receiving unit 601, a PPPoE message or an access session message that includes the session identifier and that is sent by the user equipment, where the PPPoE message is used to establish a PPPoE session, and the PPPoE session is bound to a PDU session corresponding to the session identifier; and the access session message is used to establish the access session, and the access session is bound to the PDU session corresponding to the session identifier.

Optionally, the session identifier includes at least one of a MAC address of the AGF, an internet protocol (IP) address of the AGF, a virtual local area network (VLAN) label, a GRE tunnel identifier, a multiprotocol label switching (MPLS) label, a PPPoE session identifier, a MAC address of the user equipment, or an internet protocol (IP) address of the user equipment.

The sending unit 602 is further configured to send, to the user equipment by using the PPPoE message, a received internet protocol (IP) address that is of the user equipment and that is assigned by the SMF.

The receiving unit 601 is further configured to receive a data packet that is of the PDU session and that is sent by the user equipment, where the data packet carries a session identifier.

The sending unit 602 is further configured to send the data packet to a PDU session corresponding to the session identifier.

The receiving unit 601 is further configured to: after the access session is mapped to the PDU session, receive the data packet sent by the user equipment.

If the data packet is encapsulated in a PPPoE session identifier, the session establishment unit 603 is configured to determine, based on the PPPoE session identifier, the PDU session corresponding to the data packet.

Alternatively, if the data packet is encapsulated in a MAC address of the AGF or an internet protocol (IP) address of the AGF, the session establishment unit 603 is configured to determine, based on the MAC address of the AGF or the internet protocol (IP) address of the AGF, the PDU session corresponding to the data packet.

Alternatively, if the data packet is encapsulated in a virtual wireless local area network (VLAN) label or a multiprotocol label switching (MPLS) label, the session establishing unit 603 is configured to determine, based on the VLAN label or the multiprotocol label switching (MPLS) label, the PDU session corresponding to the data packet.

Alternatively, if the data packet is encapsulated in a GRE tunnel, the session establishment unit 603 is configured to determine, based on the GRE tunnel identifier, the PDU session corresponding to the data packet.

Alternatively, if the data packet is encapsulated in a MAC address of the user equipment or an internet protocol (IP) address of the user equipment, the session establishment unit 603 is configured to determine, based on the MAC address of the user equipment or the IP address of the user equipment, the PDU session corresponding to the data packet.

Figure 7:
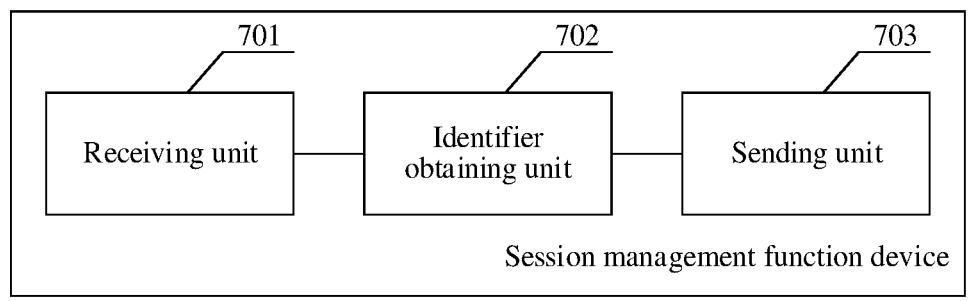
FIG. 7 is a schematic structural diagram of a session management function device according to an embodiment of the present disclosure.

An embodiment of the present disclosure further provides a session management function device. As shown in FIG. 7, the session management function device includes:

a receiving unit 701, configured to receive a PDU session establishment request message, where the PDU session establishment request message is used to request to establish a PDU session;

an identifier obtaining unit 702, configured to obtain a session identifier corresponding to the PDU session, where the session identifier is identification information of an access session related to the PDU session; and a sending unit 703, configured to send the session identifier to an access gateway function (AGF) or user equipment.

Optionally, the obtaining a session identifier corresponding to the PDU session, and sending the session identifier to an AGF or user equipment includes:

The identifier obtaining unit 702 is configured to receive the session identifier assigned by the AGE The sending unit 703 is configured to send a PDU session establishment accept message to the user equipment, where the PDU session establishment accept message includes the session identifier.

Alternatively, the identifier obtaining unit 702 is configured to receive the session identifier assigned by the user equipment. The sending unit 703 is configured to send SM information to the AGF, where the SM information includes the session identifier.

Optionally, the session identifier includes:

at least one of a MAC address of the AGF, an internet protocol (IP) address of the AGF, a virtual local area network (VLAN) label, a GRE tunnel identifier, a multiprotocol label switching (MPLS) label, a point-to-point protocol over Ethernet (PPPoE) session identifier, a MAC address of the user equipment, or an internet protocol (IP) address of the user equipment.

Optionally, that the sending unit 703 is configured to send SM information to the AGF includes: the sending unit 703 is configured to send the SM information to the AGF, where the SM information includes at least one of a virtual local area network (VLAN) label, a GRE tunnel identifier, a multiprotocol label switching (MPLS) label, a PPPoE session identifier, an internet protocol (IP) address of the user equipment, or a MAC address of the user equipment.

The sending unit 703 is further configured to send a PDU session establishment accept message to the user equipment, where the PDU session establishment accept message includes at least one of a MAC address of the AGF, an internet protocol (IP) address of the AGF, a virtual local area network (VLAN) label, a GRE tunnel identifier, a multiprotocol label switching (MPLS) label, or a PPPoE session identifier.

Figure 8:
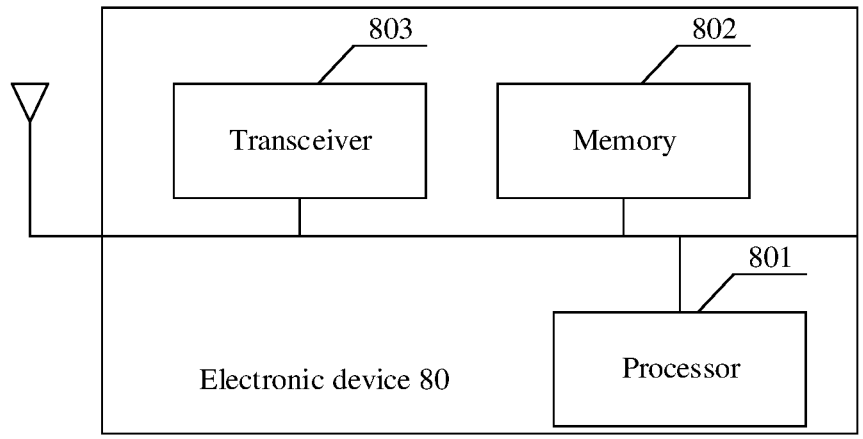
FIG. 8 is a schematic structural diagram of an electronic device according to an embodiment of the present disclosure.

FIG. 8 shows an electronic device 80 according to an embodiment of the present disclosure. The electronic device 80 includes a processor 801, a memory 802, and a transceiver 803. The processor 801, the memory 802, and the transceiver 803 may be connected to each other by a bus.

The memory 802 includes but is not limited to a random access memory (Random Access Memory, RAM), a read-only memory (ROM), an erasable programmable read-only memory (EPROM), or a compact disc read-only memory (CD-ROM). The memory 802 is configured to store related instructions and data. The transceiver 803 is configured to receive and send data. Therefore, in this embodiment, the transceiver 803 may be mapped to the sending unit and the receiving unit in the foregoing embodiments, and a function of another unit may be mapped to a function of the processor 801.

The processor 801 may include one or more central processing units (CPU). When the processor 801 includes one CPU, the CPU may be a single-core CPU or a multi-core CPU.

The processor 801 in the electronic device 80 is configured to read program code stored in the memory 802, to perform the steps in the methods in the foregoing method embodiments or the summary.

The electronic device may be an entity device such as user equipment, an AGF, or an AMF in this embodiment of the present disclosure. This depends on specific content performed by the electronic device.

Figure 9:
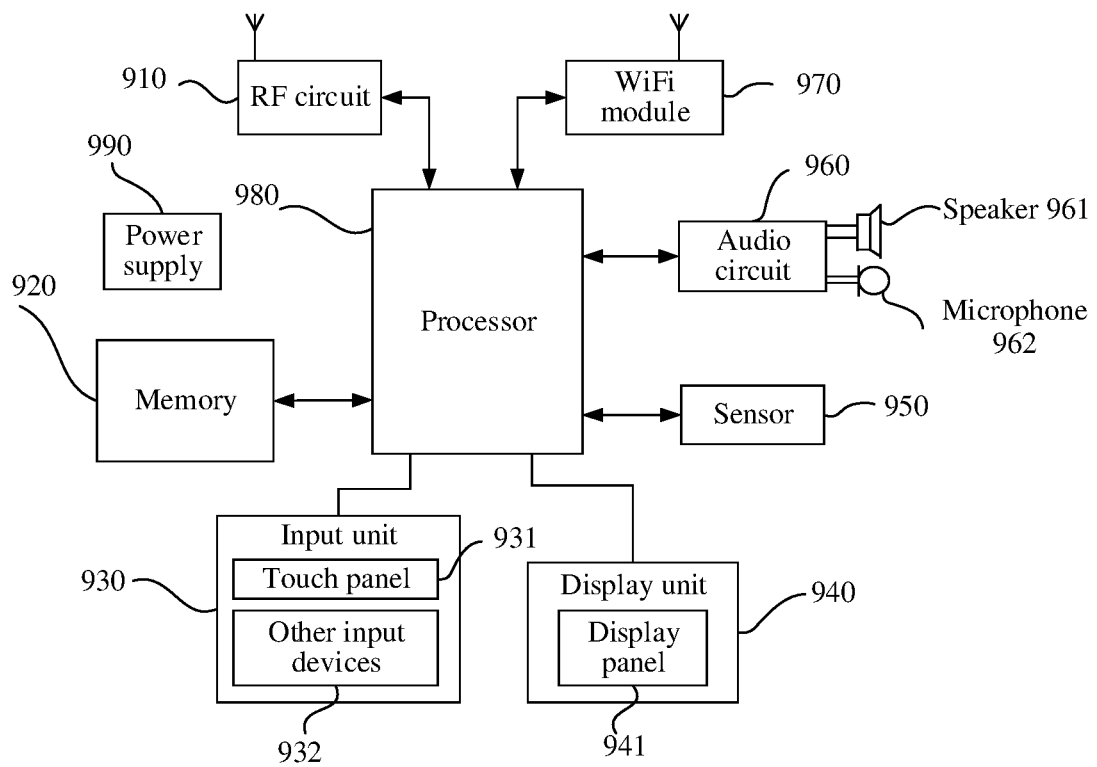
FIG. 9 is a schematic structural diagram of user equipment according to an embodiment of the present disclosure.

In an example, FIG. 9 shows an example of a hardware structure of user equipment. For ease of description, FIG. 9 shows only a part related to this embodiment of the present disclosure. For specific technical details that are not disclosed, refer to the above described method embodiment(s) of the present disclosure. The user equipment may be any user equipment including a mobile phone, a tablet computer, a PDA (personal digital assistant), a POS (point of sales), an in-vehicle computer, or the like. For example, the user equipment is a mobile phone.

FIG. 9 is a block diagram of a partial structure of a mobile phone related to the user equipment provided in an embodiment of the present disclosure. Referring to FIG. 9, the mobile phone includes components such as a radio frequency (RF) circuit 910, a memory 920, an input unit 930, a display unit 940, a sensor 950, an audio circuit 960, a wireless fidelity (WiFi) module 970, a processor 980, and a power supply 990. A person skilled in the art may understand that the structure of the mobile phone shown in FIG. 9 constitutes no limitation on the mobile phone. The mobile phone may include more or fewer components than those shown in the figure, may combine some components, or may have different component arrangements.

The following describes each constituent component of the mobile phone in detail with reference to FIG. 9.

The RF circuit 910 may be configured to receive and send a signal in an information receiving and sending process or a call process. In particular, the RF circuit 910 receives downlink information from a base station, and then sends the downlink information to the processor 980 for processing. In addition, the RF circuit 910 sends related uplink data to the base station. Usually, the RF circuit 910 includes but is not limited to an antenna, at least one amplifier, a transceiver, a coupler, a low noise amplifier (LNA), a duplexer, and the like. In addition, the RF circuit 910 may further communicate with a network and another device through wireless communication. Any communications standard or protocol may be used for the wireless communication, including but not limited to a global system for mobile communications (GSM), a general packet radio service (GPRS), a code division multiple access (CDMA) system, a wideband code division multiple access (WCDMA) system, a long term evolution (LTE) system, an email, a short message service (SMS), and the like.

The memory 920 may be configured to store a software program and a module. The processor 980 performs various function applications of the mobile phone and data processing by running the software program and the module that are stored in the memory 920. The memory 920 may mainly include a program storage area and a data storage area. The program storage area may store an operating system, an application program required by at least one function (for example, a sound play function and an image play function), and the like. The data storage area may store data (for example, audio data and an address book) created based on use of the mobile phone, and the like. In addition, the memory 920 may include a high speed random access memory, and may further include a nonvolatile memory, for example, at least one magnetic disk storage device, a flash memory device, or another volatile solid-state storage device.

The input unit 930 may be configured to: receive entered number or character information, and generate a key signal input related to a user setting and function control of the mobile phone. Specifically, the input unit 930 may include a touch panel 931 and other input devices 932. The touch panel 931, also referred to as a touchscreen, may collect a touch operation (for example, an operation performed by a user on or near the touch panel 931 by using any proper object or accessory such as a finger or a stylus) performed by the user on or near the touch panel 931, and drive a corresponding connection apparatus based on a preset program. Optionally, the touch panel 931 may include two parts: a touch detection apparatus and a touch controller. The touch detection apparatus detects a touch direction of the user, detects a signal brought by the touch operation, and transmits the signal to the touch controller. The touch controller receives touch information from the touch detection apparatus, converts the touch information into touch coordinates, then sends the touch coordinates to the processor 980, and can receive and perform a command sent by the processor 980. In addition, the touch panel 931 may be implemented in a plurality of types, such as a resistive type, a capacitive type, an infrared type, and a surface acoustic wave type. In addition to the touch panel 931, the input unit 930 may include the other input devices 932. Specifically, the other input devices 932 may include but are not limited a physical keyboard, a function key (for example, a volume control key or an on/off key), a trackball, a mouse, and/or a joystick.

The display unit 940 may be configured to display information entered by the user or information provided for the user, and various menus of the mobile phone. The display unit 940 may include a display panel 941. Optionally, the display panel 941 may be configured in a form of a liquid crystal display (LCD), an organic light-emitting diode (OLED), or the like. Further, the touch panel 931 may cover the display panel 941. When detecting the touch operation on or near the touch panel 931, the touch panel 931 transmits the touch operation to the processor 980 to determine a type of a touch event, and then the processor 980 provides a corresponding visual output on the display panel 941 based on the type of the touch event. In FIG. 9, the touch panel 931 and the display panel 941 are used as two independent components to implement input and output functions of the mobile phone. However, in some embodiments, the touch panel 931 and the display panel 941 may be integrated to implement the input and output functions of the mobile phone.

The mobile phone may further include at least one sensor 950, for example, a light sensor, a motion sensor, and/or another sensor. Specifically, the light sensor may include an ambient light sensor and/or a proximity sensor. The ambient light sensor may adjust luminance of the display panel 941 based on brightness of ambient light. The proximity sensor may turn off the display panel 941 and/or backlight when the mobile phone approaches to an ear. As a type of motion sensor, an accelerometer sensor may detect values of acceleration in all directions (usually, three axes), may detect a value and a direction of gravity when the accelerometer sensor is static, and may be used in an application that identifies a mobile phone posture (such as screen switching between a landscape mode and a portrait mode, a related game, or magnetometer posture calibration), a function related to vibration identification (such as a pedometer or a strike), and the like. Other sensors such as a gyroscope, a barometer, a hygrometer, a thermometer, and/or an infrared sensor may be further configured in the mobile phone.

The audio circuit 960, a speaker 961, and a microphone 962 may provide an audio interface between the user and the mobile phone. The audio circuit 960 may convert received audio data into an electrical signal, and transmit the electrical signal to the speaker 961, and the speaker 961 converts the electrical signal into a sound signal for output. In addition, the microphone 962 converts a collected sound signal into an electrical signal. The audio circuit 960 receives the electrical signal, converts the electrical signal into audio data, and then outputs the audio data to the processor 980 for processing. The processor 980 sends the audio data to, for example, another mobile phone by using the RF circuit 910, or outputs the audio data to the memory 920 for further processing.

WiFi belongs to a short-distance wireless transmission technology. The mobile phone may help, by using the WiFi module 970, the user receive and send an email, browse a web page, access streaming media, and the like. The WiFi module 970 provides wireless broadband internet access for the user. Although FIG. 9 shows the WiFi module 970, it may be understood that the WiFi module 970 is not a mandatory component of the mobile phone, and may be completely omitted based on a requirement.

The processor 980 is a control center of the mobile phone, connects each part of the entire mobile phone by using various interfaces and lines, and performs various functions of the mobile phone and data processing by running or executing the software program and/or the module that are/is stored in the memory 920 and invoking data stored in the memory 920, to perform overall monitoring on the mobile phone. Optionally, the processor 980 may include one or more processing units. An application processor and a modem processor may be integrated into the processor 980. The application processor mainly processes an operating system, a user interface, an application program, and the like. The modem processor mainly processes wireless communication. It may be understood that the modem processor may alternatively not be integrated into the processor 980.

The mobile phone further includes the power supply 990 (for example, a battery) supplying power to the components. The power supply may be logically connected to the processor 980 by using a power management system, to implement functions such as management of charging, discharging, and power consumption by using the power management system.

Although not shown, the mobile phone may further include a camera, a Bluetooth module, and the like.

In this embodiment of the present disclosure, the processor 980 included in the user equipment has a function corresponding to the processor 801 in the foregoing embodiment, and the RF circuit 910 and the WiFi module 970 may be mapped to functions of the sending unit and the receiving unit of the user equipment. For detailed descriptions of the executed functions, refer to the method embodiment and the apparatus embodiment of the user equipment.

An embodiment of the present disclosure further provides a computer program product. The computer program product includes an executable instruction, and when the executable instruction is executed, any method procedure provided in the embodiments of the present disclosure is implemented.

An embodiment of the present disclosure further provides a computer storage medium. The computer storage medium includes an executable instruction, and when the executable instruction is executed, any method procedure in the embodiments of the present disclosure is implemented. A person of ordinary skill in the art may understand that all or some of the procedures of the methods in the embodiments may be implemented by a computer program instructing related hardware. The program may be stored in a computer readable storage medium. When the program is executed, the procedures in the method embodiments may be included. The foregoing storage medium includes any medium that can store program code, for example, a ROM, a random access memory RAM, a magnetic disk, or an optical disc.

What is claimed is:

1. A session management method, comprising:
receiving, by an access gateway function (AGF) device, a non-access stratum (NAS) message from user equipment, wherein the NAS message comprises a PDU session establishment request message used to request to establish a packet data unit (PDU) session;
sending, by the AGF device, the NAS message to a mobility management function device;
receiving, by the mobility management function device, the NAS message;
sending, by the mobility management function device, a PDU session establishment accept message to the AGF device;
receiving, by the AGF device, the PDU session establishment accept message;
sending, by the AGF device, the PDU session establishment accept message to the user equipment;
establishing, by the AGF device, a first point-to-point protocol over Ethernet (PPPoE) session with the user equipment, wherein the first PPPoE session is related to the PDU session;
receiving, by the AGF device, a data packet encapsulated by an identifier of the first PPPoE session from the user equipment; and
determining, by the AGF device, based on the identifier of the first PPPoE session, the data packet corresponding to the PDU session.

2. The method according to claim 1, wherein
the NAS message is encapsulated by a NAS message identifier used to identify the NAS message.

3. The method according to claim 1, further comprising:
establishing, by the AGF device, a second PPPoE session between the user equipment and the AGF device before receiving the NAS message; and
receiving, by the AGF device, the NAS message comprises: receiving, by the AGF device, the NAS message in a network control protocol process corresponding to the second PPPoE session.

4. The method according to claim 3, further comprising:
receiving, by the mobility management function device, the PDU session establishment accept message from a session management function device.

5. The method according to claim 4, further comprising:
assigning, by the AGF device, an identifier of the second PPPoE session;
encapsulating, by the AGF device, the PDU session establishment accept message by the identifier of the second PPPoE session; and
sending, by the AGF device, the PDU session establishment accept message to the user equipment comprises: sending, by the AGF device, the encapsulated PDU session establishment accept message to the user equipment.

6. The method according to claim 1, further comprising:
sending, by the AGF device, the data packet to the PDU session corresponding to the identifier of the first PPPoE session.

7. A communication system, comprising an access gateway function (AGF) device and a mobility management function device;
wherein the AGF device includes a processor configured to:
receive a non-access stratum (NAS) message from user equipment, wherein the NAS message comprises a packet data unit (PDU) session establishment request message used to request to establish a PDU session;
send the NAS message to the mobility management function device;
receive a PDU session establishment accept message;
send the PDU session establishment accept message to the user equipment;
establish a first point-to-point protocol over Ethernet (PPPoE) session with the user equipment, wherein the first PPPoE session is related to the PDU session;
receive a data packet encapsulated by an identifier of the first PPPoE session from the user equipment;
determine, based on the identifier of the first PPPoE session, the data packet corresponding to the PDU session; and
the mobility management function device includes a processor configured to:
receive the NAS message; and
send the PDU session establishment accept message to the AGF device.

8. The communication system according to claim 7, wherein
the NAS message is encapsulated by a NAS message identifier used to identify the NAS message.

9. The communication system according to claim 7, wherein the processor of the AGF device is further configured to:
establish a second PPPoE session between the user equipment and the AGF device before receiving the NAS message; and
receive the NAS message in a network control protocol process corresponding to the second PPPoE session.

10. The communication system according to claim 9, wherein the processor of the mobility management function device is further configured to
receive the PDU session establishment accept message from a session management function device.

11. The communication system according to claim 10, wherein the processor of the AGF device is further configured to:
assign an identifier of the second PPPoE session;
encapsulate the PDU session establishment accept message by the identifier of the second PPPoE session; and
send the encapsulated PDU session establishment accept message to the user equipment.

12. The communication system according to claim 7, wherein the processor of the AGF device is further configured to:
send the data packet to the PDU session corresponding to the identifier of the first PPPoE session.

* * * * *

UNITED STATES PATENT AND TRADEMARK OFFICE
CERTIFICATE OF CORRECTION

PATENT NO. : 11,785,663 B2
APPLICATION NO. : 17/582152
DATED : October 10, 2023
INVENTOR(S) : Youyang Yu It is certified that error appears in the above-identified patent and that said Letters Patent is hereby corrected as shown below:

In the Specification

Column 2, Line 46, change "AGE" to "AGF.";

Column 4, Line 61, change "AGE" to "AGF.";

Column 6, Line 5, change "AGE" to "AGF.";

Column 8, Line 56, change "AGE" to "AGF.";

Column 10, Line 11, change "AGE" to "AGF.";

Column 10, Line 65, change "AGE" to "AGF.";

Column 11, Line 10, change "AGE" to "AGF.";

Column 14, Line 31, change "AGE" to "AGF.";

Column 14, Line 35, change "AGE" to "AGF.";

Column 15, Line 4, change "AGE" to "AGF.";

Column 16, Line 17, change "AGE" to "AGF.";

Column 16, Line 40, change "AGE" to "AGF.";

Column 16, Line 44, change "AGE" to "AGF.";

Column 16, Line 59, change "AGE" to "AGF.";

Signed and Sealed this
Fourteenth Day of November, 2023

Katherine Kelly Vidal
*Director of the United States Patent and Trademark Office*

CERTIFICATE OF CORRECTION (continued)
U.S. Pat. No. 11,785,663 B2

Column 17, Line 56, change "AGE" to "AGF.";

Column 17, Line 58, change "AGE" to "AGF.";

Column 17, Line 60, change "AGE" to "AGF.";

Column 18, Line 1, change "AGE" to "AGF.";

Column 18, Line 2, change "AMR" to "AMF.";

Column 19, Line 32, change "AGE" to "AGF."; and

Column 20, Line 38, change "AGE" to "AGF.".